United States Patent
Talbert et al.

(10) Patent No.: US 6,835,307 B2
(45) Date of Patent: Dec. 28, 2004

(54) THERMAL WATER TREATMENT

(75) Inventors: Sherwood G. Talbert, Columbus, OH (US); Darrell D. Paul, Upper Arlington, OH (US); Stephen M. Millett, Columbus, OH (US); David P. Evers, Canal Winchester, OH (US); James E. Dvorsky, Norwich Township, OH (US); Paul E. George, II, Powell, OH (US); Thomas D. Haubert, Columbus, OH (US); Jean E. Schelhorn, Granville Township, OH (US); Klaus H. Wiesmann, Upper Arlington, OH (US)

(73) Assignee: Battelle Memorial Institute, Columbus, OH (US)

( * ) Notice: Subject to any disclaimer, the term of this patent is extended or adjusted under 35 U.S.C. 154(b) by 0 days.

(21) Appl. No.: 09/921,344

(22) Filed: Aug. 2, 2001

(65) Prior Publication Data

US 2002/0050478 A1 May 2, 2002

Related U.S. Application Data

(60) Provisional application No. 60/222,846, filed on Aug. 4, 2000, and provisional application No. 60/294,352, filed on May 30, 2001.

(51) Int. Cl.[7] .................................................. C02F 1/02
(52) U.S. Cl. ...................... 210/175; 210/194; 165/200; 165/253; 165/288
(58) Field of Search ................................ 210/175, 194; 165/200, 253, 288

(56) References Cited

U.S. PATENT DOCUMENTS 787,909 A   4/1905   Fox
1,016,959 A   2/1912   Sadtler (List continued on next page.)

FOREIGN PATENT DOCUMENTS

| CA | 1187750 | 5/1985 |
|---|---|---|
| CH | 678656 | 10/1991 |
| DE | 3813288 | 11/1989 |
| DE | 3916195 | 8/1990 |
| DE | 19648652 | 5/1997 |
| EP | 0410924 | 1/1991 |
| WO | WO 90/05878 | 5/1990 |
| WO | WO 95/29127 | 11/1995 |
| WO | WO 00/25887 | 5/2000 |
| WO | WO 00/58223 | 10/2000 |
| WO | WO 01/19734 | 3/2001 |

OTHER PUBLICATIONS

Ruiz, Gregory M. et al., "Global Spread of Microorganisms by Ships", Nature, vol. 408, Nov. 2, 2000, p. 49.

(List continued on next page.)

Primary Examiner—Betsey Morrison Hoey
(74) Attorney, Agent, or Firm—Klaus H. Wiesmann

(57) ABSTRACT

A thermal treatment system for supplying thermally conditioned or purified water for human or animal consumption, industrial processes, environmental containment, or removal of foreign species. The water purifier includes a heat exchanger for exchanging heat between outgoing thermally conditioned or purified water and incoming makeup water; a water heater is connected to the heat exchanger so as to receive pre-heated incoming makeup water, where the water heater subsequently heats the incoming preheated makeup water to a set-point temperature in the case of thermally conditioned water and for purified water also holds the water for a period of time sufficient to inactivate selected organisms to a predetermined level. The heat exchanger has one or more treated water outlets for supplying thermally conditioned or purified water at selected temperatures.

39 Claims, 23 Drawing Sheets

U.S. PATENT DOCUMENTS

| | | |
|---|---|---|
| 1,716,692 A | 6/1929 | Gundlach |
| 1,745,323 A | 1/1930 | Coe et al. |
| 2,123,809 A | 7/1938 | Seitz |
| 2,207,057 A | 7/1940 | Gulick |
| 2,602,465 A | 7/1952 | Goehring |
| 2,625,138 A | 1/1953 | Jacoby |
| 2,711,756 A | 6/1955 | Peck et al. |
| 2,809,267 A | 10/1957 | Schauer |
| 2,814,278 A | 11/1957 | Cameron |
| 2,833,273 A | 5/1958 | Miller |
| 2,846,320 A | 8/1958 | Wittwer |
| 3,045,654 A | 7/1962 | Dell |
| 3,295,605 A | 1/1967 | Sebald |
| 3,453,840 A | 7/1969 | Nagakura et al. |
| 3,465,123 A | 9/1969 | Harris |
| 3,512,998 A | 5/1970 | Clark |
| 3,547,306 A | 12/1970 | Natterstad |
| 3,610,538 A | 10/1971 | Enders |
| 3,996,025 A | 12/1976 | Gulden |
| 4,032,311 A | 6/1977 | Bohmrich |
| 4,127,143 A | 11/1978 | Zinga |
| 4,202,406 A | 5/1980 | Avery |
| 4,241,588 A | 12/1980 | Murphy et al. |
| 4,314,606 A | 2/1982 | Muller et al. |
| 4,390,008 A | 6/1983 | Andrews |
| 4,445,023 A | 4/1984 | McKenney |
| 4,542,034 A | 9/1985 | Aule et al. |
| 4,576,222 A | 3/1986 | Granata et al. |
| 4,598,694 A | 7/1986 | Cromer |
| 4,632,065 A | 12/1986 | Kale |
| 4,739,728 A | 4/1988 | Kale |
| 4,949,680 A | 8/1990 | Kale |
| 4,969,420 A | 11/1990 | McKeon |
| 4,977,885 A | 12/1990 | Herweyer |
| 5,054,437 A | 10/1991 | Kale |
| 5,137,053 A | 8/1992 | Kale |
| 5,365,891 A | 11/1994 | Hanning |
| 5,592,969 A | 1/1997 | Reichert |
| 5,776,333 A | 7/1998 | Plester et al. |
| 5,816,181 A | 10/1998 | Sherman |
| 6,138,614 A | 10/2000 | Shropshire |
| 6,148,146 A | 11/2000 | Poore et al. |
| 6,221,262 B1 | 4/2001 | MacDonald et al. |
| 6,275,655 B1 | 8/2001 | Rixen |

OTHER PUBLICATIONS

Christen, Kris, "The Smallest Stowaways", Environmental Science and Technology, Jan. 1, 2001, p. 14A–15A.

Christen, Kris, "States Tackle Ballast Water", Environmental Science and TEchnology, Jan. 1, 2001, p. 14A.

Buchholz, Kurt et al., "Ballast Water Secondary Treatment Technology Review" (For Northeast Midwest Institute), Battelle Duxbury Operations, Aug. 24, 1998.

Dobes, Joseph C., "Ballast Water Management—A Glimpse of the Future" ASNE Environmental Symposium—Technical Papers—1997 www.asne-tw.org/PAPERS.htm.

Pacific Water Ballast Group, Working draft—Report and Recomendation.

Rigby, G.R. "Novel Ballast Water Heating Technique Offers Cost-Effective Treatment to Reduce the Risk of Global Transport of Harmful Marine Organisms", Marine Ecology Progress Series, vol. 191, p. 289–293, 1999.

Rigby, G.R. "Ballast Water Heating Technique for Reducing Global Transport of Harmful Marine Organisms", Waves, vol. 7 No. 4, Summer 2000.

Willaims, Coll, "Shipping Study: The Role of Shipping in the Introduction of Non-indigenous Aquatic Organisms to the Coastal Waters of the United States (Other than the Great Lakes) and an Analysis of Control Options", Apr., 1995, National Technical Information Service.

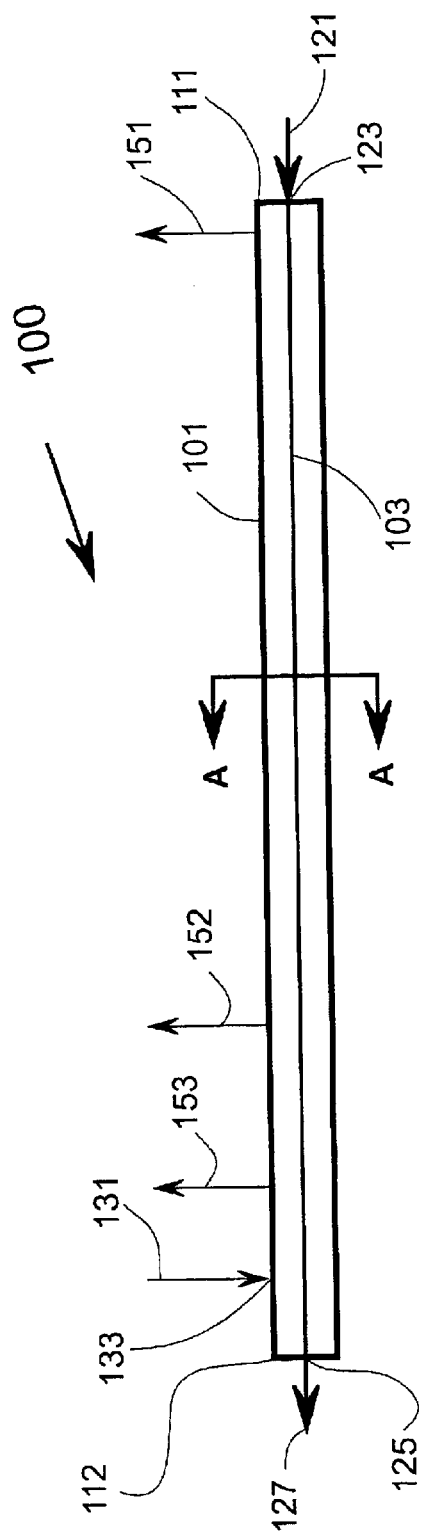
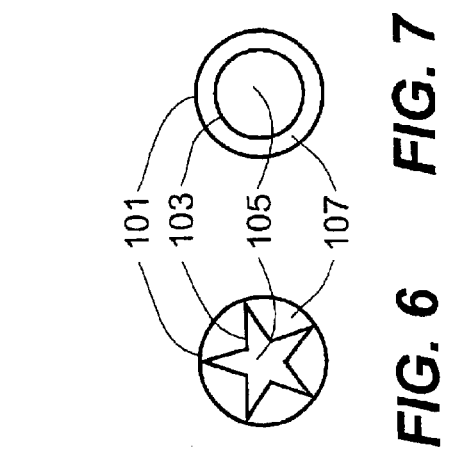
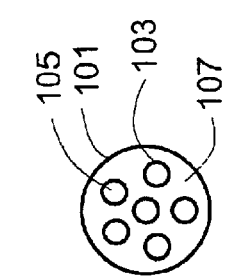
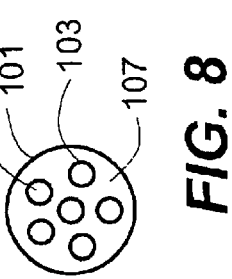

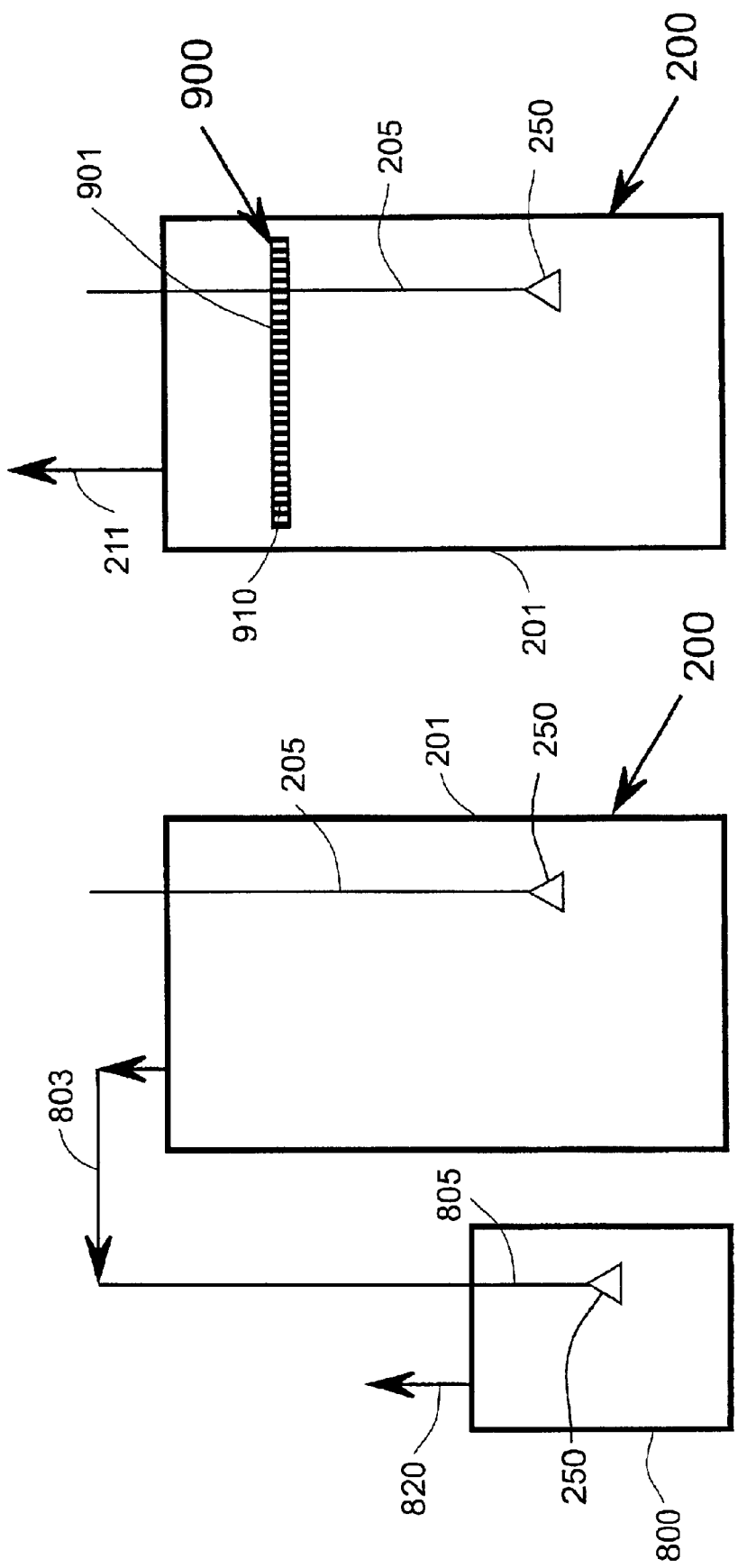

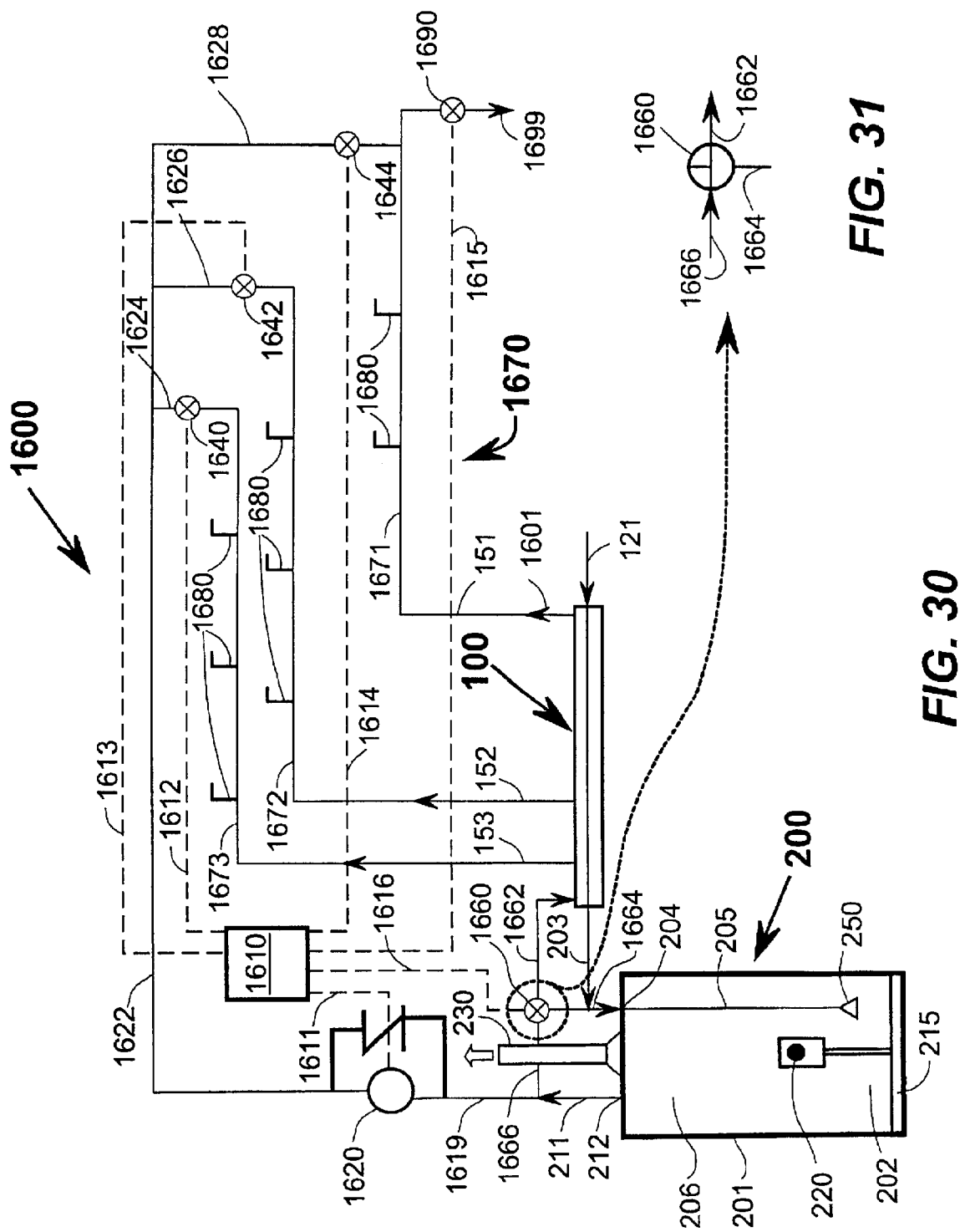

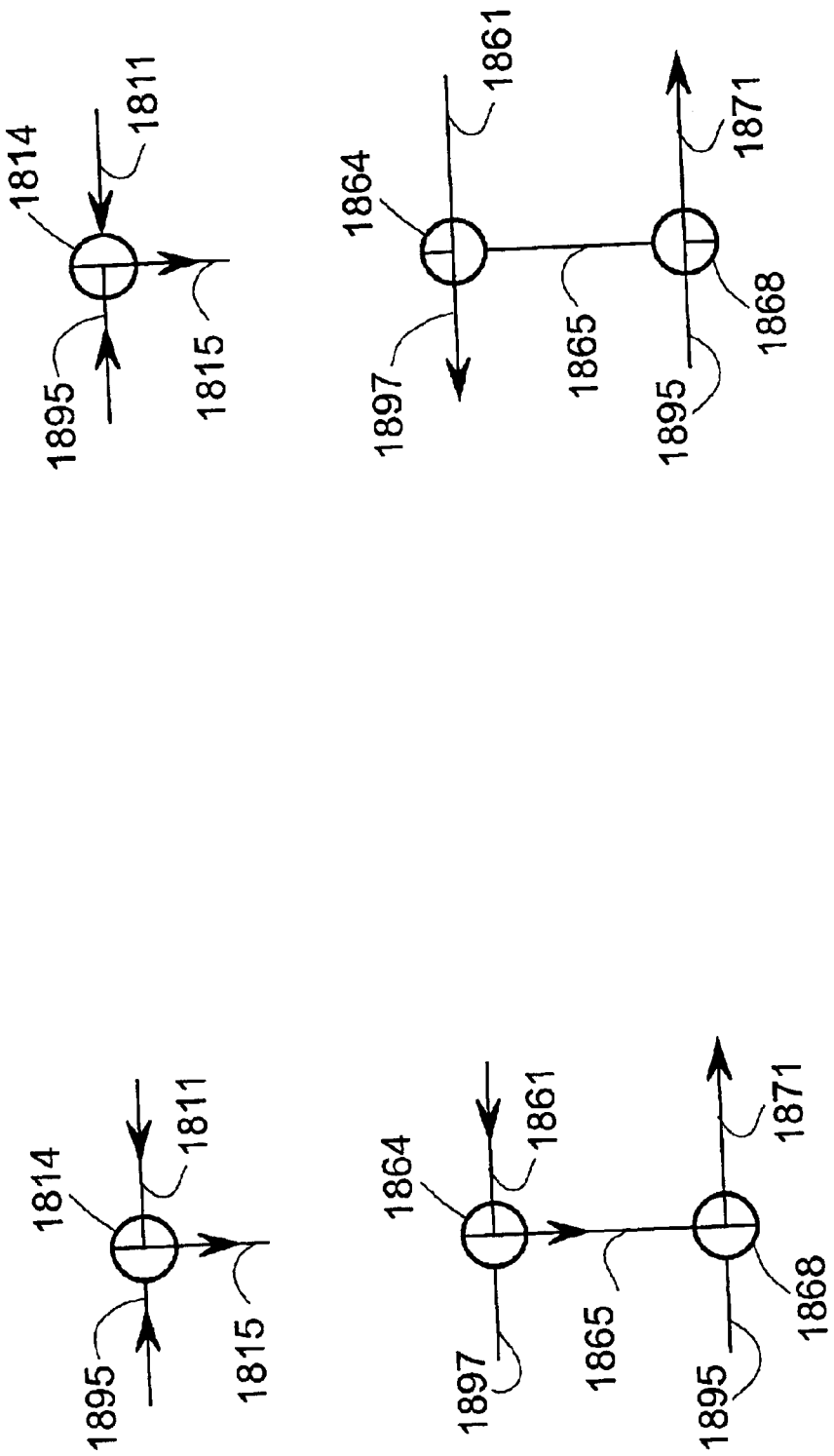

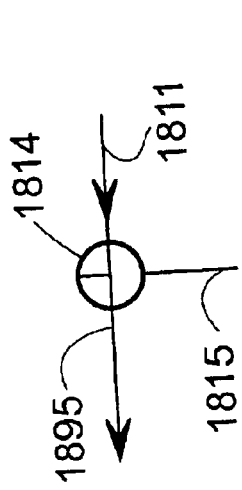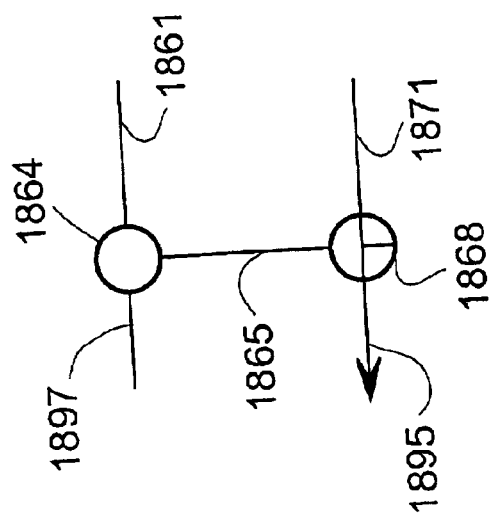
FIG. 38
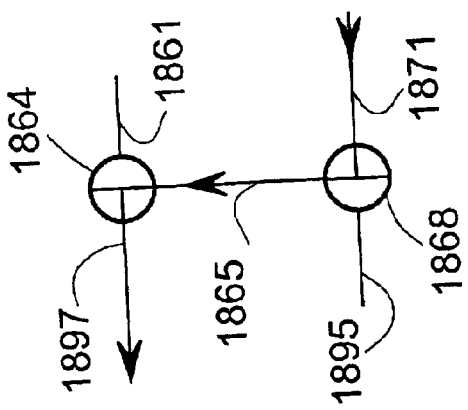
FIG. 37

THERMAL WATER TREATMENT

This application claims the benefits of U.S. Provisional Patent Application Ser. No. 60/222,846, filed Aug. 4, 2000; and U.S. Provisional Patent Application Ser. No. 60/294,352, filed May 30, 2001.

FIELD OF THE INVENTION

A commercial or residential hot and cold water treatment system that provides treated hot and cold water. The water treatment system may condition or purify the water. The water treatment system may be in a fixed location or be portable.

BACKGROUND OF THE INVENTION

Rising population and increased urbanization have increased the demand for treated water, particularly for conditioned and healthy potable water. Increasingly, however, the drivers of growth for potable water have also served to decrease the supply. While great strides have been made in treating municipal and industrial waste water before its introduction to streams, spills, breakdown of sewage treatment equipment, the existence of mixed storm/sewage systems, livestock pond overflows, groundwater contamination, and non-point sources of contamination have all served to degrade the existing supply of fresh water.

Coupled with these problems is the fact that conventional municipal and industrial water treatment systems can break down and allow water contaminated with elevated numbers or levels of live organisms to enter the distribution system. Further, even under normal operating conditions, live organisms have been known to evade current treatment systems and be distributed in water supply systems for cities and industries. In 1993, for example, an incident occurred in Milwaukee that resulted in Cryptosporidium entering the municipal drinking water. The contaminated water was subsequently distributed to homes and businesses and imbibed by many individuals. The Milwaukee incident caused an estimated 400,000 people to become ill, about 4,000 were hospitalized, and about 50 died. A recent example (summer 2000) occurred in Ontario, Canada when pathogenic E. coli bacteria entered the municipal distribution system in a town of about 5000 people. The contaminated water was subsequently distributed to homes and businesses and imbibed by many individuals. About 2000 individuals became ill and 11 died. In addition, various weather conditions, distribution system accidents, and equipment malfunctions require more frequent warnings to boil water for personal use on a regular basis throughout the United States. Water supply problems and contamination in less developed countries are far worse than in the United States or Canada. Further, the invention may be useful in alleviation of illnesses and deaths caused by intentional contamination of water systems and water supplies with pathogenic organisms by terrorist groups.

Additionally, present designs and methods of treatment in municipal and industrial potable water treatment plants do not treat or remove all Cryptosporidium or Giardia. According to the US EPA standards for water supplies-the Surface Water Treatment Rule requires systems using surface water, or ground water under the influence of surface water to (1) disinfect their water, and (2) filter their water or meet criteria for avoiding filtration so that the following contaminants are controlled at the following levels compared to the incoming water: 99% of the Cryptosporidia; 99.9% of Giardia lamblia; 99.99% of the viruses; *Legionella* has no limits but the EPA believes that if Giardia and viruses are controlled, *Legionella* will also be controlled; the heterotrophic plate count test should show no more than 500 bacterial colonies per milliliter of water. The heterotrophic plate count test will reveal any of several thousand bacteria present in the water including *E. coli*, and Staphylococcus species. There are also water turbidity tests that are required to show adequate performance of the water treatment plant. Properly operated water systems such as municipal water systems are considered to typically have about 100 heterotrophic microorganisms per milliliter of water. Thus, municipal drinking water still has a number of a variety of organisms when delivered to the consumer.

Municipal drinking water is treated to contain levels of organisms generally acceptable for persons in good health. There remains a low but quantifiable risk of infection from water borne diseases to the general population; however, those with impaired or immature immune systems are at a much higher risk. In this high risk group are typically the elderly, cancer patients, patients being treated with immunosuppressants (e.g. organ-transplant recipients), aids patients or those that are HIV positive, infants and children. Presently there is no treatment for Cryptosporidium infection; however, Giardia infections can be treated by antibiotics. Infections by other pathogenic organisms, even if treatable, often leave residual effects. For those at high risk even properly treated municipal water may still pose an unacceptable risk because of the residual organisms remaining in the water supplied to the homes, medical treatment centers, long term care facilities, or hospitals where people reside or visit for a short time.

One embodiment of the present invention reduces the risk of infection associated with water containing live organisms that subsequently enter the potable water supply of a home or business. The present invention further overcomes these problems in a way that reduces costs associated with providing thermally conditioned or purified water to a home or business.

The present invention also solves a worldwide problem caused by oceangoing shipping. When the ship enters port and is loaded, its ballast water and/or bilge water is typically pumped out. For oceangoing ships, this means that water is pumped into the ship in one part of the world and pumped out again in another. It has been estimated that for the United States alone about 80 million tons of ballast water are discharged into our ports every year. The water typically contains microorganisms, small multicellular animals and plants, small juvenile forms of various animals and plants, reproductive forms of animals, fungi, or plants such as eggs, spores, and seeds.

One proposed method of overcoming this problem is the exchange of ballast water in mid-ocean so as to replace all of the original ballast water with seawater. This solution, however, is usually impractical due to safety and stability concerns during this maneuver. Continuous ocean exchange likewise is not practical. The latter procedure would require redesign of ballast tanks and would still leave a portion of the original ballast water in the tanks.

The spread of microorganisms and multicellular organisms, by commercial and military ships, from their usual habitat to sites around the world has become a major problem today. Diseases not usually encountered in other areas can be spread widely by these ships. Likewise, animals and plants native to a particular habitat can be carried by the ships to another ecosystem. Typically, the introduction of non-native plants and animals will cause upsets in the new ecosystem and may cause local species to become rare or extinct. Additionally, there may be problems with use of the water for drinking or industrial purposes.

A good example of the problem is the introduction of zebra mussels into the Great Lakes in North America. It is believed that zebra mussels were brought into the lakes by ocean going vessels in 1988 that emptied their ballast water into one or more of the Great Lakes. Zebra mussels have multiplied because there was no natural predator, consequently they have grown uncontrolled and spread rapidly altering and damaging the Great Lakes and other ecosystems. By the year 2000, zebra mussels had spread to all states and Canadian provinces bordering the Great Lakes, the St. Lawrence River, the Mississippi River and the Ohio River, including some of their tributaries. The zebra mussels threaten native mollusks and fish. They have already caused great damage to industrial and municipal water delivery systems. Another example, in the reverse, is the introduction of the American comb jelly into the Black and Azov seas that has seriously affected the anchovy and sprat fisheries. A further example includes the possible spread of human diseases carried by water such as cholera and organisms associated with ship-generated waste water.

The above illustrates the problem for only a few species. Many more species can be and are being carried around the world causing local or widespread invasions of nonindigenous species. Therefore, apparatus and methods are needed to prevent the spread of these organisms. The present invention solves this problem in an environmentally safe way without the use of chemicals.

BRIEF DESCRIPTION OF THE INVENTION

Broadly the invention encompasses a water treatment system for providing a thermal dose to water so as to thermally condition the water to inactivate a predetermined level of selected organisms in the water. One embodiment of the invention typically provides an apparatus for providing conditioned or purified water typically including a heat exchanger for exchanging heat between purified water and makeup water, having a makeup water inlet and a preheated makeup water outlet; at least one heat exchange surface between the purified water and makeup water, a treated water inlet, and at least one or more treated water outlets; and a water heater tank with a tank inlet and a tank outlet, wherein the tank inlet is connected to the heat exchanger makeup water outlet and the tank outlet is connected to the heat exchanger treated water inlet. The one or more treated water outlets are typically located upstream or downstream from each other respectively and provide treated water at different temperatures. Typically a sensing and/or controlling device is included for determining time/temperature relationships at one or more locations of the apparatus to determine if water has been treated to a predetermined amount. The monitoring device may emit signals perceptible to the user as to water conditions or relationships for time, temperature, and so on.

Additional embodiments typically include bypass apparatus for bypassing the heat exchanger during distribution system purification. The apparatus may include a valve connected to the inlet of the heat exchanger, the valve operable to stop makeup water flow to the heat exchanger and redirecting the flow of makeup water; and water lines connected to one outlet of the valve for receiving redirected makeup water from the valve and redirecting the makeup water to the water heater.

A further embodiment of the invention typically includes flow-impeding elements such as diffusers, baffles, and the like. Diffusers typically include brush, cone and screen diffusers that slow the velocity of water entering the water heater or water tank. Baffles typically include fixed and floating baffles such as those known in the art, floating baffles having a plurality of floats of selected specific gravities. One embodiment advantageously uses a heated baffle system to separate and heat hotter and cooler water layers.

An additional embodiment of the invention typically provides a method for purifying or conditioning water by the steps of flowing makeup water into an inlet of a heat exchanger having a makeup water inlet and an outlet for preheated makeup water, and an inlet and one or more treated water outlets in a purified water section of the heat exchanger and preheating the makeup water; flowing the preheated makeup water to a water heater tank; heating the preheated makeup water to a predetermined elevated temperature; holding the heated water above a selected temperature in a portion of the tank so as not to mix with the preheated makeup water for a time sufficient to purify the heated water; flowing the purified water into the inlet of the purified water section of the heat exchanger and cooling the water as it flows through the heat exchanger; withdrawing water through one or more treated water outlets of the purified water section of the heat exchanger.

A still further embodiment typically includes a method for purifying a water distribution system including the steps of providing a water purification system having a bypass system as described herein and shutting off the flow of makeup water to the heat exchanger; bypassing the heat exchanger and flowing makeup water into the inlet of the water heater; and withdrawing hot purified water from the treated water outlets of the heat exchanger, and flowing the water to selected fixtures to purify water distribution lines and fixtures attached to the treated water outlets, until all have been turned on for a sufficient time to purify the plumbing water lines and fixtures leading from the outlets. Typically, the fixtures are turned on for a selected period of time, the water flow is stopped after the temperature of water flowing from a fixture does not change for a second selected period of time, and the fixture and lines allowed to purify at elevated temperature for a third selected period of time sufficient to provide a thermal dose for inactivating at least a predetermined level of selected organisms in water distribution lines of the fixture.

A further embodiment of the invention includes a water treater typically having a heat exchanger for exchanging heat between treated water and makeup water, and having a treated water inlet and a preheated makeup water outlet; and a hot treated water inlet and at least one outlet for withdrawing treated water at a reduced temperature; a water heater with an inlet and an outlet, wherein the water heater inlet is connected to the heat exchanger preheated makeup water outlet and the water heater outlet is connected to the heat exchanger hot treated water inlet; at least one mixing valve with an outlet and at least two inlets having a first inlet connected to one treated water outlet of the heat exchanger, for obtaining treated water at a reduced temperature there from, and a second inlet connected to the water heater outlet for obtaining hot treated water, wherein the mixing valve provides treated water at the mixing valve outlet at an intermediate temperature between the hot treated water and the reduced temperature treated water.

An additional embodiment of the invention provides for a method for providing stratification control in a hot water heater tank, typically by providing a hot water heater having a plurality of mix-impeding elements, the mix-impeding elements having one or more specific gravities corresponding to one or more desired water temperatures, and the mix-impeding elements movable within the hot water heater to adjust to the one or more desired temperatures, impeding the mixing of water above the plurality of mix-impeding elements and water below the mix-impeding elements as the level of the one or more desired temperatures in the hot water tank varies.

A still further embodiment of the invention includes a method for increasing the effective first-hour rating (output capacity, DOE, 1998 see below) of a hot water tank, typically by providing a hot water tank having a first-hour rating (first output capacity) for heating water, and having a heated water outlet for heated water of at least one desired temperature, and a tank inlet; adding a heat exchanger and flowing makeup water into the heat exchanger thereby pre-heating the makeup water and flowing the pre-heated makeup water to the tank inlet; introducing the pre-heated makeup water at an elevated temperature to the hot water tank; using the introduced preheated makeup water to increase the effective first-hour rating (output capacity) of the hot water tank, thereby enabling the water tank to effectively deliver a first-hour rating (second output capacity) of hot water which is greater than the first-hour rating (first output capacity) without the heat exchanger. Typically, the effective capacity may be increased by apparatus for providing stratification control in the hot water tank, including at least one mix-impeding element impeding the mixing of water above the plurality of mix-impeding elements and water below the plurality of mix-impeding elements as the level of one or more desired temperatures in the hot water tank varies; and thereby maintaining the volume of heated water above the plurality of mix-impeding elements at a desired temperature for delivery at the heated water outlet. Typically, the effective capacity may be increased by providing stratification control in the hot water tank, comprising a plurality of mix-impeding elements at one or more specific gravities impeding the mixing of water above the plurality of mix-impeding elements and water below the plurality of mix-impeding elements as the level of one or more desired temperatures in the hot water tank varies; maintaining the volume of heated water above the plurality of mix-impeding elements at the one or more desired temperatures for delivery at the tank outlet; and using the plurality of mix-impeding elements for heating water to more effectively increase the temperature of makeup water to the desired temperature of the heated water, thereby increasing the effective output capacity of the hot water tank.

A yet further embodiment of the invention includes a thermal ballast-water treatment system for a ship typically including a heat treatment system as disclosed herein for heat treating incoming ballast water, outgoing ballast water, and/or stored ballast water; a ballast water tank connected to the heat treatment system for storing treated water or water to be treated; and a pump connected to the heat treatment system and/or ballast water tank. A typical variation of this embodiment includes a method having the steps for thermally treating ship ballast water while pumping water from a ship's surroundings or from a ship's interior to a heat treatment system; treating the water with heat using apparatus as disclosed herein to provide a thermal dose sufficient to inactivate a selected percent of selected organisms present in the water; and pumping the treated water to a ballast tank on the ship. A further typical variation of this embodiment includes a method having the steps for thermally treating ship ballast water including pumping water from a ship's surroundings or from a ship's interior to a tank on a ship; holding the water in the tank for several hours or more; pumping the held water to a heat treatment system as disclosed herein and treating the water with heat to provide a thermal dose sufficient to inactivate a selected percent of selected organisms present in the water; and discharging the treated water to the environment. Another typical variation of this embodiment includes a method having the steps for thermally treating ship ballast water including pumping water from a ship's surroundings or from a ship's interior to a heat treatment system; treating the water with heat to provide a thermal dose sufficient to inactivate a selected percent of selected organisms present in the water; pumping the treated water to a tank on the ship and holding the water in the tank; pumping the held water to the heat treatment system; treating the water in the heat treatment system for a second time with heat to provide a thermal dose sufficient to inactivate a selected percent of selected organisms present in the held water; and pumping the second heat treated water outside the ship.

Another embodiment of the invention includes an apparatus for providing treated water including a heat exchanger typically having a first section and a second section located upstream from the first section for exchanging heat, wherein the first section exchanges heat between water from an auxiliary heater and makeup water, and the second section exchanges heat between water from an auxiliary heater to water from a water tank, the heat exchanger first section having a makeup water inlet and a preheated makeup water outlet; at least one heat exchange surface in the first section between the water from the auxiliary heater and makeup water, the heat exchanger second section having at least one surface between the water from the auxiliary heater and the water from the water tank, the second heat exchanger section having an inlet for water from the auxiliary heater water and an outlet for water to the auxiliary water heater, an inlet for water from the water tank, and the first section has at least one or more treated water outlets; a water heater tank with a tank inlet and a tank outlet, wherein the tank inlet is connected to receive water from the first section heat exchanger makeup water outlet and the tank outlet is connected to deliver water to a second section inlet for water from the water tank; and an auxiliary heater having an inlet connected to an outlet from the second section of the heat exchanger for receiving water from the water tank that has been preheated in the second heat exchanger section, and the auxiliary heater having an outlet connected to the inlet on the second section heat exchanger for water from the auxiliary heater. In some typical applications a delay line or water tank is connected between the outlet of the auxiliary heater and the inlet on the second section heat exchanger receiving water from the auxiliary heater. The delay line or water tank may be included to provide additional thermal treatment time for water that exits the auxiliary heater.

An additional embodiment of the invention includes a heat exchanger for a hot water treating system typically including a treated water to makeup water heat exchanger for exchanging heat between treated water and makeup water, and having a makeup water inlet and a preheated makeup water outlet; and a hot treated water inlet and at least two treated outlets for withdrawing treated water at reduced temperatures; and wherein the treated water outlets provide treated water at different temperatures. The heat exchanger typically has its preheated makeup water outlet connected to a tank-type hot water heater.

A yet additional embodiment includes a purification control system for a plumbing system typically including a heat exchanger having an inlet and an outlet for makeup water, and an inlet for hot water and at least one outlet water at reduced temperature; a three-way valve (or other means such as multiple valves in place of the three way valves) for controlling water flow from at least one outlet at reduced temperature having an inlet for water from the at least one outlet at reduced temperature from heat exchanger, a valve outlet; and a second valve inlet; water lines for flowing hot water from a source of hot purified water to the second valve inlet of the three-way valve. Typically, the purification control system has at least two outlets for supplying water at reduced temperatures from the heat exchanger.

BRIEF DESCRIPTION OF THE DRAWINGS

FIG. 3 is a schematic of a heat exchanger 100 from FIG. 2 according to another embodiment of the invention.

FIGS. 4, 5, 6, and 7 are depictions of typical cross sections, at A—A, of a tube-in-tube heat exchanger according to the invention, see FIG. 3.

FIG. 8 illustrates a cross section A—A of a heat exchanger having multiple inner tubes for cold water flow to increase surface area and heat transfer.

FIG. 17 is a schematic of another embodiment of the invention utilizing a second water tank 800 to act as a holding tank for treated hot water.

FIG. 18 is a schematic of another embodiment of the invention utilizing one or more baffles 900 inside the water heater tank to enhance stratification, prevent mixing and/or enhance achievement of proper thermal dose.

FIG. 30 is a schematic of a purification loop illustrating a three-way valve 1660 setting for normal water flow according to the invention.

FIG. 31 is a more detailed schematic of a three-way valve 1660 set at a normal setting according to the invention.

FIG. 35 is a schematic showing details of valve settings for FIG. 34 for thermally treating water from outside a ship that is being pumped to a ballast tank 1890.

FIG. 36 is a schematic showing details of valve settings for FIG. 34 for thermally treating water pumped from a ballast tank for discharge outside a ship.

FIG. 37 is a schematic showing details of valve settings for FIG. 34 while pumping water from outside a ship directly to a ballast tank without thermal treatment of the water.

FIG. 38 is a schematic showing details of valve settings for FIG. 34 for pumping water to a ballast tank without thermal treatment of the water.

DETAILED DESCRIPTION OF THE INVENTION AND BEST MODE

Figure 2:
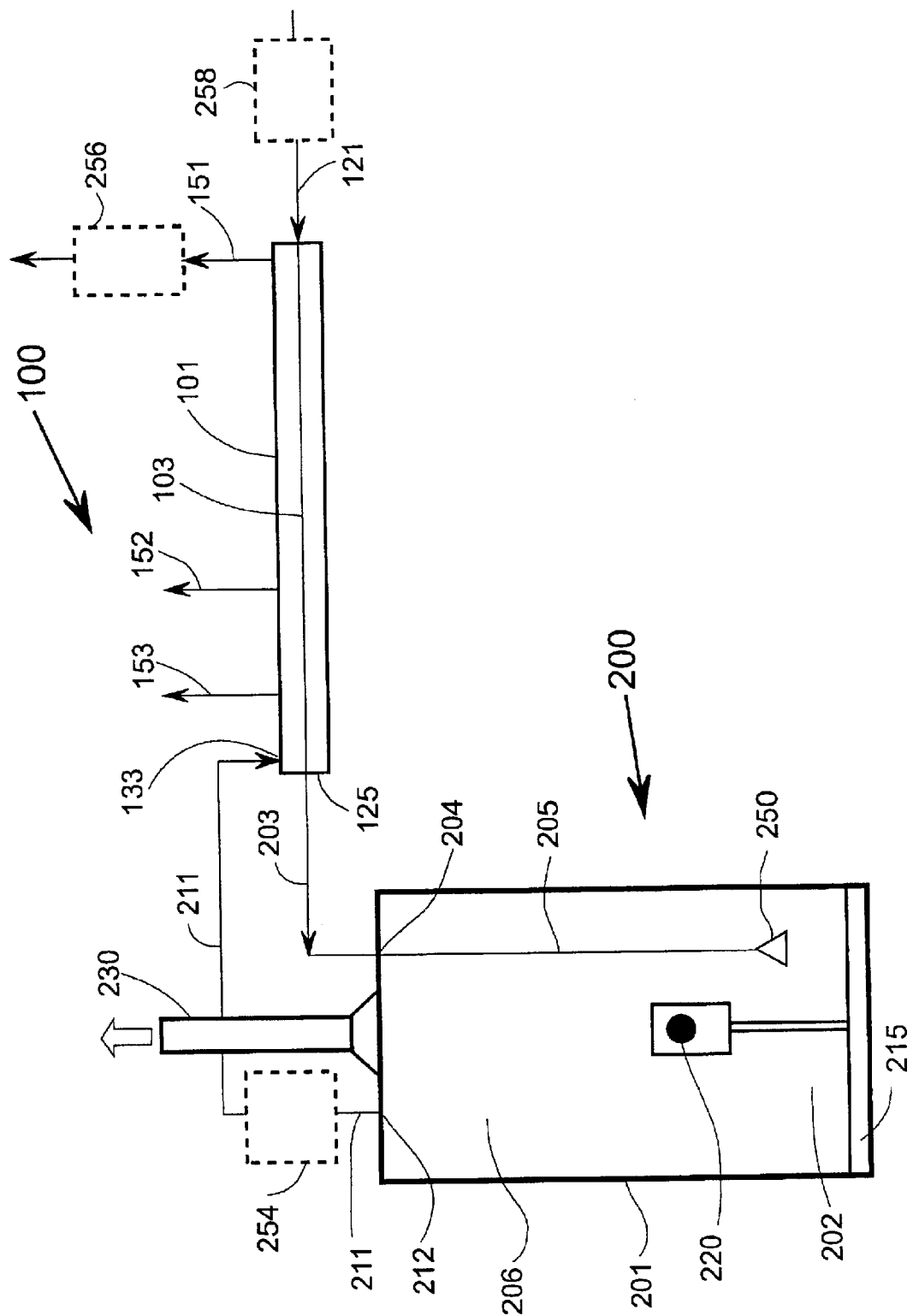
FIG. 2 is a schematic of a water heater 200 (e.g. conventional gas-fired, oil-fired, or electric) fitted with a tube-in-tube, counter-flow heat exchanger 100, like that shown in FIGS. 3 through 8, that is located between the water heater 200 and the outside cold water source, makeup water 121.

In a broad embodiment of the invention as depicted in FIG. 2, there is disclosed a multi-outlet, counter-flow water-to-water heat exchanger 100 that will work in conjunction with a residential or commercial water heater 200 (e.g. gas fired or electrically heated) to treat all of the hot and cold water used in a home or business. The counter-flow heat exchanger 100 supplies treated domestic hot water at one or more temperatures. For example, one or more hot water supplies may be supplied to the clothes washer and dishwasher, shower and tub and bathroom sinks, Jacuzzi™ tubs, and kitchen sinks. In addition, treated cold water slightly higher but near the temperature of the incoming, makeup water 121 may be obtained. If desired additional external cooling for the treated cold water supply may be used such as an electric cooling unit or an additional heat exchanger that extracts additional heat to the surrounding air with a fan, or a home refrigerator. A gas or electric water heater tank 201 is maintained at a high enough set-point temperature (e.g. 140° F. (60° C.) or higher) to inactivate organisms that may be present in the cold makeup water supply. An additional factor to consider is the time at which the water is maintained at a high enough temperature needed to inactivate the various organisms that may be present, referred to as a "thermal dose", see below. The higher the water temperature the less time is needed to obtain the treating or purifying effect. Therefore a balance between the two, time and temperature, needs to be made in order to inactivate the most resistant organisms expected in the system or the most resistant organisms that one wishes to reduce in number (i.e. inactivate).

Some embodiments of the present invention provide for a device that eliminates mixing or tempering valves while still providing water at controlled temperatures to the user. Elimination of one or more tempering valves with the disclosed heat exchanger 100 allows cost reductions and/or an increase in reliability.

Large systems or smaller portable units may be used in mobile housing units, campers, seafaring cargo ships or passenger liners or cruise ships, pleasure boats, airplanes, aquariums, large public events or other uses where reliability and/or mobility of a purified water supply is a factor. Availability of a reliable potable water supply on cruise ships is becoming of increased importance since these ships are increasing in number and typically enter ports of call where the local water supply may be compromised. An advantage of the present invention in this regard is the ability to purify the water taken into a ship to selected levels. Should the shipboard water distribution system become compromised the present invention provides for purification of the system. Alternatively and most preferably, the water distribution system may be purified on a scheduled basis to prevent buildup of organisms in the system and thus prevent illness. Although water is treated with heat, the present invention provides for reduced costs since a heat exchanger extracts some of the heat from treated water, especially from treated cold water. Another advantage of the invention is that it provides an effective increase in water tank output capacity for new or retrofit applications. This latter advantage provides capital cost and space advantages and is described in more detail below. Some embodiments of the invention may be provided as modular portable free-standing units that can be used in emergencies to provide hot water or cold water (e.g. for domestic use) when normal systems are disrupted such as during a flood or natural disaster.

Figure 1:
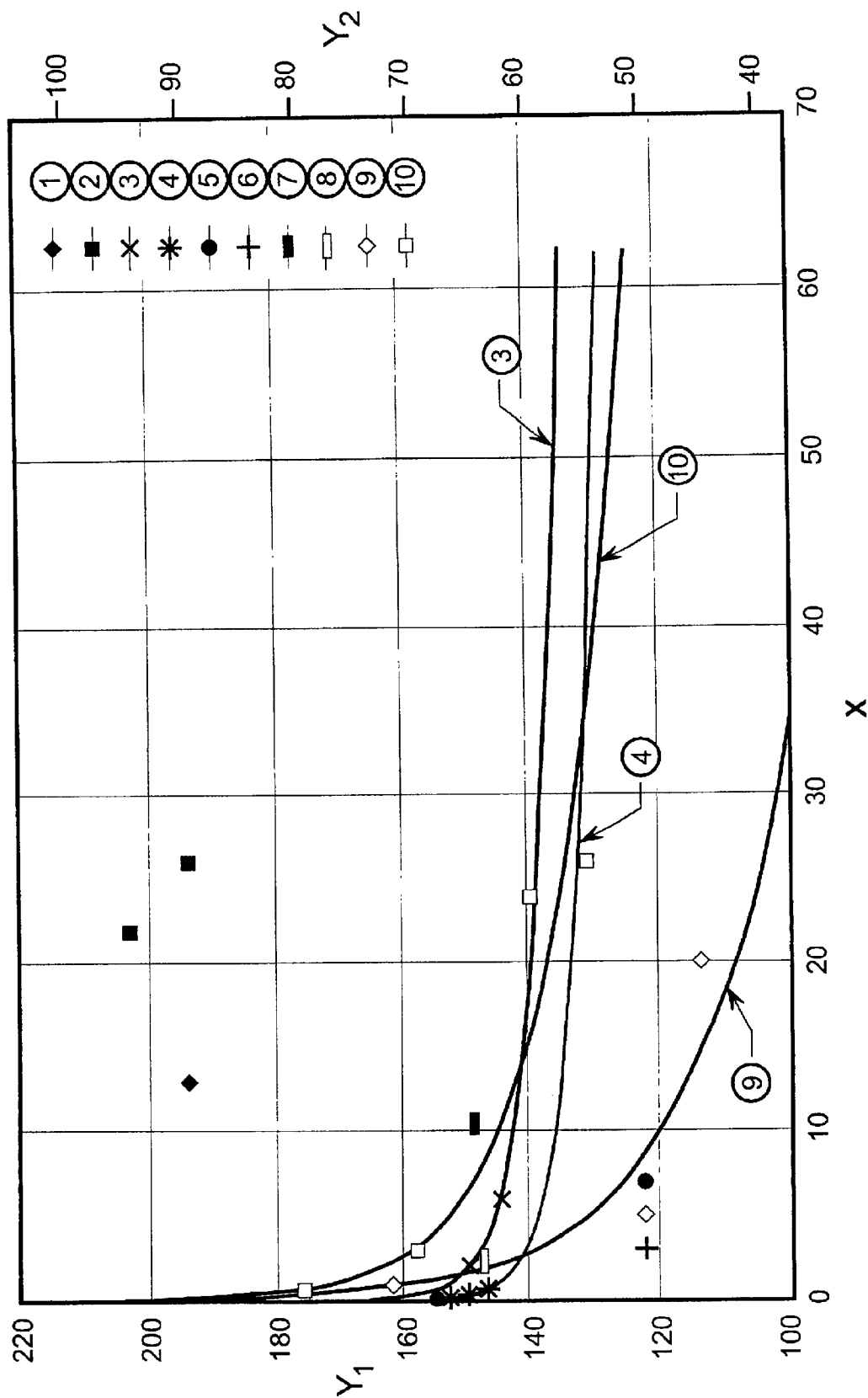
FIG. 1 is a graph of typical thermal dose response curves for several microorganisms found in water that relate temperature and time for inactivating 99% of the organisms which may be originally present in the water. The left vertical axis labeled $Y_1$ represents temperature in degrees Fahrenheit (° F.) while the right vertical axis $Y_2$ represents temperature in degrees Celsius (° C.). The horizontal axis labeled, X, represents time in minutes to inactivate 99% of organisms present in water.

Referring now to FIG. 1, this figure relates to one embodiment of the invention that results in purification of the water by inactivation of viable organisms present in the water. FIG. 1 shows a graph of typical thermal dose response data and selected curves for several organisms, that relate temperature and time for inactivating 99% of the organisms originally present in the water. Data for ten organisms are depicted on the graph and are labeled by numbers (1) through (10). The organisms having data plotted are:

(1) *Bacillus anthracis* spores,
(2) *Bacillus subtilis* spores,
(3) *Salmonella senftenberg*,
(4) *Mycobacterium tuberculosis*,
(5) Herpes Simplex virus Type I,
(6) Poliovirus Type I,
(7) *Giardia lamblia*,
(8) Hepatitis virus,
(9) *Cryptosporidium parvum* oocysts, and
(10) *Legionella pneumophila*

Curves have been fitted for the data for (3) *Salmonella senftenberg*, (4) *Mycobacterium tuberculosis*, (9) *Cryptosporidium parvum* oocysts, and (10) *Legionella pneumophila*.

FIG. 1 illustrates clearly that higher water temperatures require much lower residence times to achieve the 99% inactivation. Thus, typical temperatures for fast inactivation of organisms are preferably high, and the apparatus of the invention is typically operated at temperatures above 140° F. (60° C.). By way of example, a water temperature of 140° F. (60° C) provides reasonable times (3 or 4 minutes) for a thermal dose for inactivating 99% of the Cryptosporidium that was present in the Milwaukee, Wis. incident. However, if fast inactivation of other species particularly *Legionella pneumophila*, or Giardia species is desired, temperatures above 150° F. (66° C.), even more preferably above about 160° F. (71° C.) and most preferably above about 170° F. should be selected. If spores of various organisms are desired to be inactivated as well, FIG. 1 indicates that operation at or above 200° F. (93° C.), or 210° F. (99° C.) is desirable. The exact minimum temperatures will be determined by the residence time required, the throughput of the system, the heat resistance of the various organisms to be inactivated, and the level of contamination of the incoming water. Upper operating temperatures are dictated largely by the boiling point of water and the ability of the system to operate at temperatures at or near the atmospheric boiling point of water, and in cases where the system is pressurized above the normal boiling point. Clearly, operation near or above the atmospheric boiling point of water, 212° F. (100° C.), will result in high rates of inactivation at relatively low holding times. Thus, in some embodiments of the invention where the system is pressurized and built for high temperature and high pressures, such as in commercial operations, temperatures of operation about or above 210° F. (99° C.), about or above 220° F. (104° C.), or even about or above 230° F. (110°C.), including the saturation temperature of the water, are within the teachings of the invention. Presently, typical embodiments intended for residential use at temperatures between 140° F. (60° C.) to 210° F. (99° C.) are also within the teachings of the invention; other typical temperature ranges for faster inactivation include temperatures between 150° F. (66° C.) and 210° F. (99° C.), and temperatures between about 160° F. (71° C.) and 210° F. (99° C.). Alternatively, the water may be heated up to the saturation temperature of the water. Another alternative is to use embodiments that increase holding time and/or enhance stratification or prevent mixing so that the water is treated at a particular temperature for a longer period of time. A second holding tank, one or more baffles within the tank, or other devices to prevent mixing, and slowing the rates of flow with diffusers are examples. Once knowing the teachings of the invention, those skilled in the art will be able to select proper temperatures, holding times, and equipment capacities to handle the contamination and usage requirements contemplated for a particular site.

The minimum goal of one embodiment of the present invention is to have temperatures and holding times to achieve a thermal dose sufficient to inactivate at least 99% of the organisms possible in incoming makeup water. In further embodiments higher thermal doses can achieve inactivation of 99.9%, and 99.99% or higher of the incoming organisms. At sufficiently high temperatures and thermal doses, substantially complete sterilization can be achieved. A preferred minimum setpoint temperature for the water heater thermostat is about 140° F. (60° C.). A more preferred minimum setpoint temperature for the water heater is about 150° F. (66° C.), and more preferably about 160° F. (71° C.). The latter temperatures will significantly reduce the required time to achieve 99% inactivation or better for important and typical infectious units such as *Cryptosporidium parvum* oocysts, *E. coli, Legionaella pneumophila*, Poliovirus type 1, Herpex simplex virus type 1, and *Giardia lamblia*.

It is important to note that in one embodiment of the invention the apparatus of the present invention is typically meant to be operated with a source of potable water as for example a municipal water system, industrial water supply system, good quality well water, cisterns having clean collected rain water and the like. If the incoming water is not of the quality described above, or if odor or taste is undesirable, then pretreatment of the water will typically be required such as with particle filters, activated carbon filters, ion exchangers and the like (see FIG. 2, items 254, 256 and 258).

Definitions

Ballast water—water pumped into a ship to give stability to a ship when it is underway. The water is typically pumped into and out of ballast tanks depending on the amount of cargo the ship is carrying. Ballast water is typically pumped in and out of a ship from the surrounding water at the site where cargo is loaded and unloaded.

Bilge water—water generated on a ship that may be waste water generated by cooking or washing operations, toilets and the like or other water that is the result of ship operation. Bilge water is typically contaminated with organisms and typically requires pre-processing such as filtering or oil separation to remove solids and/or oils. Bilge water includes water that has leaked into a ship.

Conditioned water—Water that has been treated with heat. Conditioned water may have a reduced level of viable organisms compared to incoming makeup water, however, the water is typically not treated with heat to the extent that purification occurs so that disease is prevented or the spread of viable organisms is prevented. Conditioned water is typically used in applications where purification is not important, yet a supply of reliable heated water at a controlled temperature with heat recovery is important. Typical examples include low temperature baths for maintaining temperature as in a greenhouse or a facility for growing organisms in a controlled temperature environment.

First-hour rating—An industry standard for rating the heating abilities and capacities of water heaters. The first-hour rating of a water heater is defined as the amount of hot water, in gallons (liters), that a water heater can supply in one hour, starting with a full tank of fully heated water. The outlet water temperature at the start of a draw is at 135° F. (57°); hot water is then withdrawn at about 3 gpm (11.4 Lpm) (for residential water heaters), until the outlet temperature of the water heater drops to 110° F. (43° C.), at which time the draw is stopped. If the one hour has not passed when the water reaches the lower temperature, the tank is allowed to reheat to the higher temperature, then additional water is withdrawn until the water again reaches the lower temperature limit or one hour has passed. Several cycles may occur in the one-hour time period. The number of gallons (liters) withdrawn in that time is used in an equation to calculate the first-hour rating for the water heater. This method can also be used to measure the effective storage output capacity of a hot water tank with and without a heat exchanger. Note that here and throughout the application, gpm represents gallons per minute and Lpm represents liters per minute. Incorporated herein by reference is the publication "Uniform test method for measuring the energy consumption of water heaters" 10CFR Part 430, subpart B, Appendix E; U.S. Department of Energy, 1998.

Fixture—as used herein the term fixture refers to water outlets such as faucets, shower heads, outlets to water tanks in toilets, separate hot, intermediate or cold water faucets, dual hot and cold water faucets, controls at toilet tanks, outlets to washers, and the like, and other miscellaneous water outlets from the water distribution system where the user desires access to treated water.

Heat exchanger—as used herein an apparatus designed to transfer heat from one fluid to another. The heat exchanger in the present invention typically includes a surface between the two fluids where heat is exchanged through the surface from one fluid to the other, and two or more chambers where heat exchange takes place. The heat exchanger is preferably a counter-flow type heat exchanger.

Inactivate—as used herein, in reference to organisms or microorganisms, inactivate means to kill selected organisms typically to a selected level of viable organisms, reduce the number of viable organisms to a selected level, or to treat the organisms so that they no longer present a substantial threat of disease or present a substantial threat to the consumer of water or water user, or to the distribution of organisms within the water system or the environment. Typically inactivated organisms or non-viable organisms are either killed, unable to reproduce to cause disease in a user, or unable to reproduce in the environment.

Makeup water—Water entering the apparatus of the invention that may be from potable or non-potable sources.

Organism—the organisms to be treated herein are typically pathogenic to humans or animals in one or more of their life cycles, or disrupt the local ecology, and include fungi and their spores, protozoans and their cysts, bacteria and their spores, viruses, helminths or their ova, insects, small fish and their ova, mollusks and their ova, and other types of living organisms. The term organism is meant to include not only strictly those that are unicellular but also those that are small but multicellular such as helminths, the ova or cysts of multicellular organisms found in water, and the like. The organisms may be micro-cellular, uni-cellular, multi-cellular, and the like. In other embodiments, the organisms, although not pathogenic or ecologically disruptive, are typically destructive of industrial processes or equipment. Control of nuisance organisms such as algae that grow in watery environments is also included within the invention.

Potable water—water that can be ingested by a typically healthy individual without producing unwanted effects in the individual such as disease or ill feeling such as nausea or the like. Potable water meets or exceeds the minimum standards set by the United States Environmental Protection Agency (US EPA) for drinking water supplies. Potable water meets the standards of the US EPA and is drinkable on a steady basis by individuals with normally functioning immune systems that are not otherwise impaired so as to require specially treated water. Seasonal upsets due to weather conditions, upsets in the operation of a water treatment plant, and other factors will typically affect the levels of organisms that enter the potable water supply and may occasionally exceed the standards set by the US EPA. When discovered the treatment plant may issue a "boiling water" alert. It is during these times that individuals with health impairments are at risk.

Purified water—Water that has been treated by the method and/or apparatus of the invention disclosed herein that has a reduced level of viable organisms compared to the incoming makeup water.

Residence time—as used herein, the time that water should remain at a certain temperature to effectively inactivate a certain percentage of the organisms that may be present in the water. The effective residence time of a water heater tank would be the typical amount of time that water entering the tank would remain in the tank at a desired elevated temperature before being drawn out through the hot water outlet line. This may also be referred to as the holding time, retention time, or contact time. The residence time of water at a certain temperature in combination with the temperature determines the "thermal dose" achieved for a particular organism.

Saturation temperature—The temperature at which the vapor pressure of the water is equal to that of the ambient water pressure. Boiling occurs at this temperature.

Treated water, treatment of water, or treating of water—as used herein, general terms that include the conditioning and/or purification of water.

Thermal dose—The combination of residence time and a particular temperature that is required to inactivate a certain percentage of a particular organism. Each species of organism exhibits a different thermal dose response curve to achieve a certain level of reduction in viable organisms. Typically a thermal dose response graph relates residence time at a particular temperature with the percent of organisms that are inactivated. The 99% thermal dose response graph of FIG. 1, relates residence time and temperature to obtain 99% of inactivated organisms in hot water. For example, a 99% thermal dose for Cryptosporidia will require about 120° F. (49° C.) for about 10 minutes to inactivate approximately 99% of the Cryptosporidia present in the water, while a 99% thermal dose at about 160° F. (71° C.) for about 1 minute is expected to produce the same level of 99% inactivation. For comparison a 99.9% thermal dose will typically require a combination of higher temperatures and/ or longer residence times at temperature to achieve the higher 99.9% inactivation level. Additional graphs or relationships for thermal dose for other organisms besides those listed or for different percent thermal doses (e.g. 80%, 90%, 95%, 99.9%, 99.99%) can easily be generated by those skilled in the art.

The conditioned water has been treated with heat and then partially cooled in the heat exchanger to achieve a selected temperature of delivery to one or more sites in a home or business. In some embodiments the conditioned water may be used in a portable device.

For purified water, the water has been treated to effectively inactivate substantially all of a particular organism in the water so as to reduce the risk of infection to a user. In this respect, one embodiment of the invention treats incoming water so that 99% of a particular incoming species of organisms are inactivated. In yet other embodiments, depending on the design and thermal doses, 99.9 %, 99.99%, and even 99.999% and above of particular organisms or organisms in the incoming water are inactivated. In this respect, of particular interest in the present invention are *Giardia lamblia*, Cryptosporidia, *E. coli*, Legionella, polio virus, Mycobacteria, herpes simplex virus, hepatitis virus, helminths, typhoid, cholera and other pathogenic organisms that occasionally or chronically enter the water supply. Purification in the present invention is by thermal means but may also be supplemented chemically (via treatment with disinfectants), and physical means (via filtration), or a combination thereof. The supplemental purification steps or apparatus may be before, after, or both before and after the purification steps or apparatus of the present invention.

Referring now to FIG. 2, this figure illustrates heat exchanger 100 and a water heater 200 fitted with a tube-in-tube, water-to-water, counter-flow exchanger like that shown in FIGS. 3 through 8. Water heater 200 is typically a conventional gas, oil, electric, or heat pump heated storage-tank water heater as desired. The heat exchanger 100 is located between the water heater 200 and the makeup water 121 supply. The incoming contaminated water from the heat exchanger 100 flows into the water heater tank 201 through tank inlet line 203 and then into the tank at tank inlet 204 through the dip tube 205 and optional diffuser 250. Treated hot water exits the top of the water heater tank 201 at tank outlet 212 via tank outlet line 211 that connects to the treated water inlet 133 of heat exchanger 100. Water heater tank 201 of FIG. 2 also illustrates a typical temperature control 220 for the water heater 200 and a typical flue vent 230 if a gas or oil fired heater is used. However, a water heater that uses electricity or some other source of heat would also work.

It is important that the preheated makeup water from the heat exchanger 100, flowing in tank inlet line 203, enter the water heater tank 201 through a dip tube 205 or a similar device or inlet configuration that places the cooler water at or near the bottom of lower tank section 202, as shown in FIG. 2. By putting the cooler water into the lower tank section 202, the tank will tend to stratify with minimum mixing, and thus the cooler water will be gradually heated to near the predetermined set-point temperature 140° F. (60° C.) or higher before the cooler water mixes throughout the water heater tank 201 because of internal thermal circulation. Preferably, an optional diffuser 250 will also be used. This will help ensure that the cooler water entering the water heater tank 201 will be sufficiently heated to reach the required "residence time" and "thermal dose" before mixing with the hottest treated water near the top of the water heater tank 201. A fixed or floating baffle system 900 or 1000 discussed in detail in the section related to FIGS. 18 and 19 below further enhances stratification and helps ensure that appropriate thermal doses are obtained. Likewise, a diffuser 250 at the end of dip tube 205 will enhance stratification by reducing mixing within the water heater tank 201. Specific diffusers are discussed in detail elsewhere below.

The mechanism used in this concept for treating, for purification of all of the water entering the water heater 200, is to maintain the water in the water heater tank 201 at a sufficiently high temperature, and for a long enough period of time, to inactivate the various types of organisms sometimes found in municipal or other types of drinking water. The proper amount of time-at-temperature to inactivate a certain percentage of a particular organism is termed a "thermal dose", and is usually different for each type of organism. For example, for *Cryptosporidia* in water that was responsible for the deaths in Milwaukee, a typical thermal dose to inactivate 99% of the organisms would be about 150° F. (66° C.) for about two minutes as shown in FIG. 1. For the *E. coli* responsible for the recent deaths in Ontario, Canada, a typical thermal dose would be about 150° F. (66° C.) for about six minutes, or at 160° F. (71° C.) for about three minutes to reduce the bacterial population in the incoming water by about 99%.

If desired, optional auxiliary treatment units 254, 256, 258 may be added (indicated by dashed lines). Auxiliary treatment units 254, 256, 258 may include optional filters such as particle filters, activated carbon filters; and/or ion exchangers and the like. An added benefit for the treating, conditioning, or purification devices discussed herein is that the life of optional filters (auxiliary treatment unit 254) at tank outlet 212, or at first, second, and third treated water outlets 151, 152, or 153 are extended (auxiliary treatment unit 256 is typical). This is due to the fact that the water passing through auxiliary treatment unit 254 is heated so that it becomes too hot for organisms to grow. Auxiliary treatment unit 256 may be treated and purified when the water distribution system is treated with sufficiently hot water, filter media can be regenerated and/or the number of any organisms present in the filter media (e.g. auxiliary treatment unit 256) reduced according to the thermal dose applied.

Referring now to FIG. 3, this figure illustrates a heat exchanger 100 in a tube-in-tube counter-flow configuration that is useful with the invention. The embodiment shown can be used to provide a cost effective means of supplying treated (conditioned or purified) water for both the hot and cold domestic water needs of a residence or a commercial enterprise. The embodiment shown also can be used as a portable system for emergency uses to supply conditioned or purified hot and cold water. Heat exchanger 100 consists of an outer tube 101 of metal, plastic or similar material. Cross section A—A of FIG. 3 depicted in FIG. 4 shows one embodiment of how such a tube-in-tube heat exchanger could be arranged. Other typical cross sections A—A are shown in FIGS. 5 through 8. FIG. 8 illustrates a special case for the heat exchanger 100 where multiple inner tubes 103 for makeup water are mounted within the heat exchanger outer tube 101. The multiple tubes are gathered at a plenum (not shown) at both ends of the heat exchanger 100 in typical ways known in the art. The configuration of FIG. 8 improves heat transfer effectiveness and reduces physical size for the overall heat exchanger.

Within outer tube 101 is an inner tube 103 (or multiple tubes as in FIG. 8 that separates the interior into two spaced apart volumes, makeup water channel 105 and treated water channel 107. The walls of outer tube 101 and inner tube 103 may be configured or convoluted as is known in the art to effectively transfer heat from treated water channel 107 to makeup water channel 105. End walls 111, 112 serve to keep conditioned or purified water within the confines of the heat exchanger 100, and may have an inlet or outlet for heat exchanger 100. The makeup water channel 105 goes completely through the heat exchanger 100 without being sealed off at either end. Incoming potentially contaminated water, makeup water 121, enters makeup water channel 105 at makeup water inlet 123 and travels the length of the heat exchanger 100 to exit at preheated makeup water outlet 125. Contaminated makeup water 127 from the preheated makeup water outlet 125 of heat exchanger 100 has now been preheated as will be further explained below. If desirable for some applications, with appropriate changes in water lines, the incoming makeup water and treated water flows could be switched between the makeup water channel 105 and treated water channel 107.

Hot treated water 131 enters heat exchanger 100 through its outer tube 101 at treated water inlet 133. The hot treated water 131 flows through the length of heat exchanger 100 where it heats the makeup water 121 while the hot treated water 131 is cooled, as will be explained in more detail below. Hot or cold treated water may be withdrawn at one or more treated outlets typically illustrated as first, second, and third treated water outlets 151, 152, and 153. The heat exchanger 100 is configured as a tube in tube, water-to-water counter-flow heat exchanger.

The purpose of the heat exchanger 100 is threefold. First, it preheats all of the cold, potentially contaminated water going into the water heater 200 by exchanging heat with the outgoing hot treated water 131. Second, it cools the hot treated water 131 coming from the water heater 200 to one or more desired hot water temperatures (e.g. 125° F. and/or 140° F.; 52° C. and/or 60° C.). Third, it further cools the remaining hot treated water to a cold water temperature that is only slightly warmer than the incoming cold water (typically about 10° F. (5.6° C.) to 20° F. (11° C.) warmer). The heat exchanger 100 will perform equally well if only one or two hot water draws at second and third treated water outlets 152, 153 are being made, or if only a cold water draw is being made at first treated water outlet 151, or if several types of draws are being made simultaneously. In one embodiment, the heat exchanger 100 can also be used for providing only purified cold water for drinking purposes at first treated water outlet 151, without using the second and third treated water outlets 152, 153. The hottest hot water outlet, third treated water outlet 153 may be at about 140° F. (60° C.) to about 150° F. (66° C.) and might supply the dishwasher and/or clothes washer appliances. The second hot water outlet, second treated outlet 152 may be at about 120° F. (49° C.) to 130° F. (54° C.) and could be used for the other hot domestic water needs such as bathing and sink uses.

A further advantage of the heat exchanger 100 and system in which it is used according to the present invention is that it provides for an increase in the effective output capacity of a water heater 200 or hot water tank 800. This increase in the effective output capacity of the water tank or water heater can be measured using industry standards such as the first-hour rating explained above (DOE, 1998). A first first-hour rating output capacity can be measured without the heat exchanger 100 and a second first-hour rating output capacity can be measured with the heat exchanger 100 in place. The difference between the second and first first-hour ratings being the increased effective output capacity of the water heater 200 or hot water tank 800.

A heat exchanger presently preferred uses an outer tube 101 of copper, type-K, 1.125 in. OD, with 0.065 inch wall thickness, that is about 160 inches long. The inner tube 103 is also of copper, type-M, 0.875 inch OD (before twisting of the flutes), with a 0.032 inch wall thickness. When coiled the coil has a mean diameter of about 14.5 inches, with 3.5 turns of the tube-in-tube heat exchanger. The water flow is about 2.5 gpm (9.5 Lpm) of cold water entering through the inside tube, makeup water channel 105, and 2.5 gpm (9.5 Lpm) of hot water entering the outside, treated water channel 107 in a counter-flow direction. Presently, the approach temperature, that is the temperature difference between the cold purified water exiting the heat exchanger outer tube 101 at first treated water outlet 151 and the cold makeup water 121 entering the heat exchanger is about 20° F. (11° C.). Nominally, the entering cold makeup water 121 is at about 55° F. (13° C.), but can vary from about 35° F. (2° C.) to about 75° F. (24° C.) from winter to summer; while the preheated makeup water 127 leaving the heat exchanger, originally municipal makeup water, is now at about 140° F. (60° C.). Entering purified hot water in one typical design is nominally 160° F. (71° C.) and the leaving cold purified water is about 75° F. (24° C.). Various hot water purified water outlets may be placed on the heat exchanger 100 at locations to nominally provide intermediate temperatures between the highest and the lowest available temperature (e.g. 140° F. (60° C.) and 125° F. (52° C.)) purified water supplies. The nominal pressure drop for each side of the heat exchanger 100 was about 5.0 pounds per square inch at 2.5 gpm (9.5 Lpm).

EXAMPLES 1–5

The following examples, shown in Table 1, serve to illustrate several different types of treated water draws on the apparatus of the invention. The temperature control 220 set-point temperature was assumed to be at about 160° F. (71° C.). The inlet municipal water temperature (makeup water 121) was assumed to be about 55° F. (13° C.). The mixed shower water temperature used in Example 4 was assumed to be about 105° F. (41° C.) and drawing 1.8 gpm (6.8 Lpm) of purified water at about 125° F. (52° C.) and 0.7 gpm (2.6 Lpm) of purified water at about 75° F. (24° C.). The purified hot water could be drawn either from second treated water outlet 152 (for domestic hot water) or from third treated water outlet 153 (for laundry or dishwasher), or from both of these treated water outlets simultaneously.

TABLE 1

Illustration of Various Treated Water Draw Conditions

| Example | Draw Location (Treated water Outlet No.) | Water Flow Amount (gpm/Lpm)[b] | Purified Water Outlet Temp (° F./° C.) |
|---|---|---|---|
| 1 | 151 | 2.5/9.5 | 75/24 |
| 2 | 152 | 2.5/9.5 | 125/52 |
| 3 | 153 | 5.0/18.9 | 140/60 |
| 4[a] | 152 | 1.8/6.8 | 125/52 |
|  | 151 | 0.7/2.6 | 75/24 |
| 5 | 151 | 0.6/2.3 | 75/24 |

[a]this example represents a shower draw at a nominal 105° F. (41° C.), with hot and cold purified waters mixed
[b]gpm = gallons per minute, Lpm-liters per minute Five different water draw conditions are depicted in Table 1 for the apparatus of FIG. 3. The corresponding flow rates and temperatures also are indicated in Table 1 by the corresponding numbers. For example, in Example 1 using first treated water outlet 151, a purified cold water draw of 2.5 gpm (9.5 Lpm) will produce a balanced counter-flow through the entire length of the heat exchanger 100. Municipal water shown entering at about 55° F. (13° C.) would be preheated to about 140° F. (60° C.), while the purified hot water entering at about 160° F. (71° C.) is being cooled to about 75° F. (24° C.). In Example 2, using second treated water outlet 152, a purified hot water draw of 2.5 gpm (9.5 Lpm) at about 125° F. (52° C.) will only use a portion of the heat exchanger 100 to preheat the incoming water to around 90° F. (32° C.). Meanwhile, the about 160° F. (71° C.) hot water from the water heater tank 201 is cooled to about 125° F. (52° C.) at second treated water outlet 152 to provide domestic purified hot water. In Example 3, using third treated water outlet 153, 5 gpm (19 Lpm) (of hot water for laundry or dishwater uses is being drawn at a nominal temperature of about 140° F. (60° C.). Use of hot water from third treated water outlet 153 results in the smallest preheat of the incoming water (to about 75° F., 24° C.) and the greatest demand on the water heating system. In Example 4, using first treated water outlet 151 and second treated water outlet 152, a shower draw of 2.5 gpm (9.5 Lpm) with a mixed temperature at the shower head of about 105° F. (41° C.) is assumed. The shower draw may consist of 1.8 gpm (6.8 Lpm) of about 125° F. (52° C.) purified hot water from second treated water outlet 152 blended with 0.7 gpm (2.6 Lpm) of about 75° F. (24° C.) purified water from first treated water outlet 151. In Example 5, a low water flow of 0.6 gpm (2.3 Lpm) from first treated water outlet 151 is shown for drinking or other domestic purposes.

870F (31° C.) respectively, with makeup water entering at about 70° F. (21° C.). Examples 7 and 10 were hot and cold water draws from first treated water outlet 151 and second treated water outlet 152 that were mixed to form a typical 2.5 gpm (9.5 Lpm) shower draw of purified water at 105° F. (41° C.). Examples 8, 9, and 11 are various hot purified water draws from either second or third treated water outlets 152, 153. Example 13 consisted of two simultaneous purified water draws, with purified drinking water from treated water outlet 151 and a shower draw from first and second treated water outlets 151, 152. Example 14 consisted of three simultaneous purified water draws: purified drinking water from treated water outlet 151; a purified water shower draw from first and second treated outlets 151, 152; and a purified water laundry draw from third treated water outlet 153.

TABLE 2

STEADY-STATE TEMPERATURE DATA ON PROTOTYPE WATER TREATER

| Example | Water Draw Rate (gpm)/Lpm ** | Heat Exchanger treated water outlet used for Draw (No.) | Temperature Top of Water heater tank (° F./° C.) | Temperature of water at third treated water outlet 153 (° F./° C.) | Temperature of water mixed at shower outlets 151 & 152 (° F./° C.) | Temperature of water at second treated water outlet 152 (° F./° C.) | Temperature of water at first treated water outlet 151 (° F./° C.) | Temperature of City Makeup Water In (° F./° C.) |
|---|---|---|---|---|---|---|---|---|
| 6 | 0.625/2.36 | 151 | 156/69 | * | * | * | 86/30 | 70/21 |
| 7 | 2.5/9.5 mix | 151 & 152 | 156/69 | * | 105/41 | * | * | 70/21 |
| 8 | 3.0/11.4 | 152 | 155/69 | * | * | 110/43 | * | 70/21 |
| 9 | 5.0/18.9 | 153 | 160/71 | 126/52 | * | * | * | 70/21 |
| 10 | 2.5/9.5 mix | 151 & 152 | 159/71 | * | 105/41 | * | * | 70/21 |
| 11 | 3.0/11.4 | 152 | 159/71 | * | * | 112/44 | * | 70/21 |
| 12 | 0.625/2.36 | 151 | 159/71 | * | * | * | 87/31 | 72/22 |
| 13 | 0.625/2.36 +2.5/9.5 mix | 151 151 & 152 | 159/71 | * | 105/41 | * | 80/27 | 71/22 |
| 14 | 0.625/2.36 +2.5/9.5 mix +5.0/18.9 | 151 151 & 152 153 | 158/70 | 132/55 | 104/40 | * | 73/23 | 71/22 |

* not used or measured
** gpm = gallons per minute, Lpm = liters per minute

EXAMPLES 6–14

Figure 9:
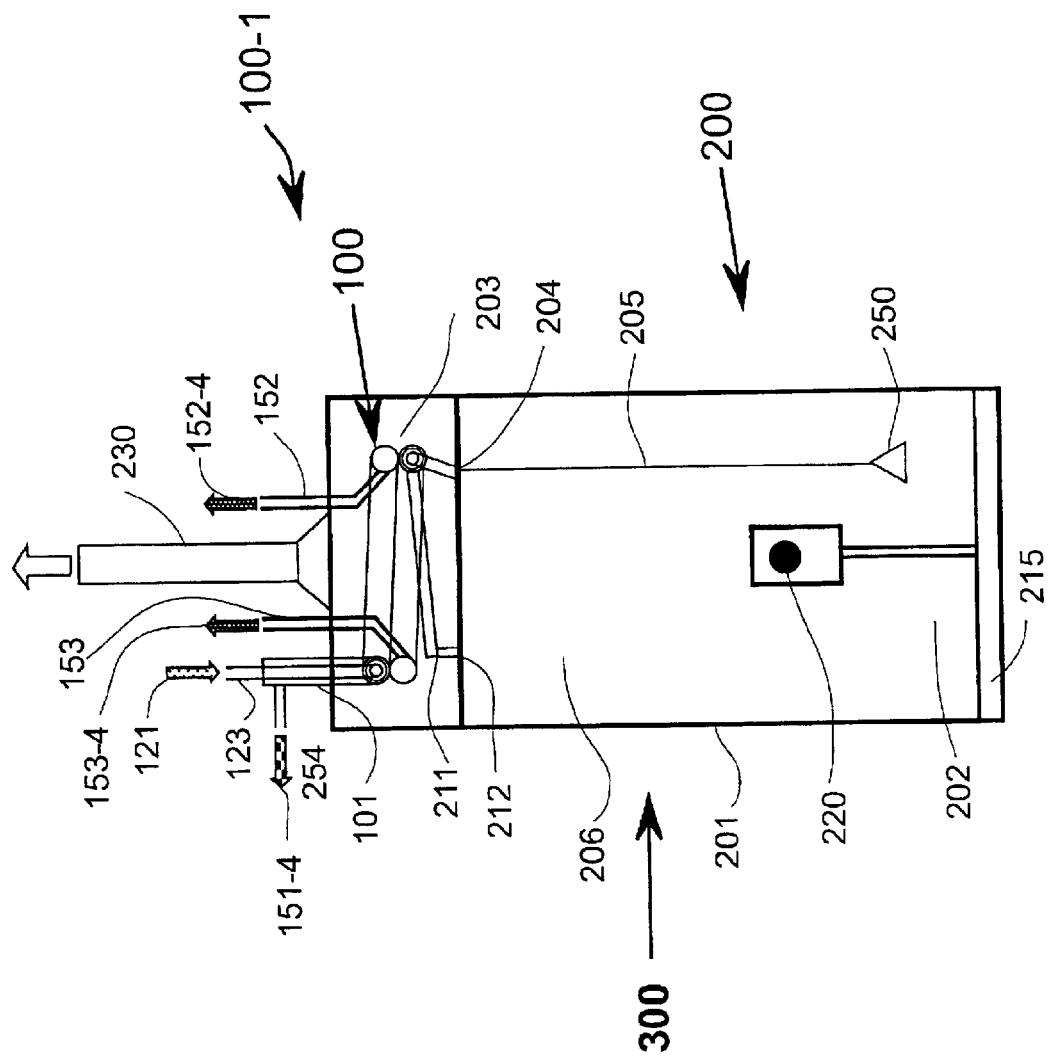
FIG. 9 is a schematic of an integrated water treatment apparatus utilizing a water heater and a tube-in-tube heat exchanger like that in FIGS. 3 through 8, which is another embodiment of the invention.

Table 2, shown below, illustrates several tests performed on a prototype of the invention as illustrated in FIGS. 3 and 9. The heat exchanger 100 was of the type illustrated in FIG. 3, but was coiled to fit in the space above the water heater tank 201, as shown schematically in FIG. 9. Further details of the heat exchanger 100 are given in a previous section above. The tests to obtain the data for Table 2 were performed with the heat exchanger 100 connected to a residential type 40 gallon (151 liter) natural gas water heater having a heat input of about 38,000 BTU/hr and a first-hour rating of 65 gallons (246 liters) (Ruud, Ruudglas Pacemaker Model No. P40-38, made by Rheem, Montgomery, Ala., USA).

Examples 6 and 12 illustrate cold purified water draws from first treated water outlet 151 that at a flow of 0.625 gpm (2.36 Lpm) had outflow temperatures of 86° F. (30° C.) and

EXAMPLES 15–19

Table 3 lists measured water draw capacities at various outlet water draw rates at first, second, and third treated water outlets 151, 152, 153 (respectively) using the apparatus of FIG. 9. The results are a worst case scenario in that no baffles or diffusers were used. Use of baffles or diffusers to prevent mixing and maintain stratification would increase the water draw output capacity. The draw rates were measured in gallons per minute (liters per minute). For each of the listed draw rates, the number of gallons (liters) were obtained that were able to be drawn with a 20° F. (11° C.) drop in outlet water temperature. The starting outlet water temperature was 160° F. (71° C.) and the ending outlet water temperature was 140° F. (60° C.).

TABLE 3

Treated Water (Conditioned or Purified Water) Draw Capacities at Various Water Draw Rates

| Example | Draw Location (Treated Water Outlet No.) | Water Flow Amount (gpm/Lpm)[a] | Water Draw Output capacity (gallons/ liters) |
|---|---|---|---|
| 15 | 153 | 5.0/18.9 | 29.6/112 |
| 16 | 152 | 3.0/11.4 | 31.1/118 |
| 17 | 151 & 152 | 2.5/9.5[b] | 34.1/129 |

TABLE 3-continued

Treated Water (Conditioned or Purified Water) Draw Capacities at Various Water Draw Rates

| Example | Draw Location (Treated Water Outlet No.) | Water Flow Amount (gpm/Lpm)[a] | Water Draw Output capacity (gallons/ liters) |
|---|---|---|---|
| 18 | 151 | 2.5/9.5 | 30.9/117 |
| 19 | 151 | 0.625/2.36 | Unlimited |

[a] gpm = gallons per minute, Lpm = liters per minute.
[b] 0.7 gallons (2.7 liters) from outlet 151, and 1.8 gallons (6.8 liters) from outlet 152.

If necessary for achieving the proper hot water outlet temperatures at the various purified water outlet locations, such as the about 140° F. (60° C.) (third treated water outlet 153) or the about 125° F. (52° C.) (second treated water outlet 152) purified water outlets, the design of the tube-in-tube heat exchanger in the hotter sections between treated water inlet 133 and second treated water outlet 152 of the heat exchanger 100 could be different in cross section than the cross section shown in FIG. 4 for the last section between first and second treated water outlets 152, 151. The different designs for this section could consist of different tube sizes or different convolution designs, such as those shown in FIGS. 5, 6, and 7. In a less preferred embodiment, these different sections also could be separate heat exchangers that are connected in series to accomplish the counter-flow design.

Referring now to FIG. 9, this figure illustrates an integrated water treatment system 300 that can be built new or retrofit with an existing water heater. The integrated water treatment system 300 includes a heat exchanger module 100-1 and a water heater 200. A heat exchanger 100 (e.g. a tube-in-tube heat exchanger as in FIG. 3) including any necessary and associated water lines and valves (e.g. valves, optional bypass system 400) typically constitutes the heat exchanger module 100-1. The heat exchanger 100 as shown is typically coiled and mounted over the top of the water heater tank 201 so that the overall appearance is that of a typical water heater. Heat exchanger 100 is shown coiled above the top of the water heater tank 201 so that the mounting is compact and requires no additional floor space. Incoming contaminated water designated as makeup water 121, enters makeup water inlet 123 of the heat exchanger 100 and separated therefrom are first, second, and third treated water outlets provided at 151, 152, and 153. Operation of the heat exchanger 100 and water heater 200 combination is as described before. Purified cold water 151-4 is withdrawn at first treated water outlet 151, purified hot water 152-4 at an intermediate temperature is withdrawn at second treated water outlet 152, and purified hot water 153-4 which represents the hottest water is withdrawn at third treated water outlet 153. Typically the water heater 200 has a stratification enhancer such as diffuser 250 that reduces mixing of the incoming water with hot water already in the water heater tank 201.

Stratification enhancers are discussed in more detail below; however, some additional detail is provided here for the case where a heat exchanger module 100-1 is provided as an addition or retrofit for an existing hot water heater. In this case any stratification enhancer would have to fit through the tank inlet 204 or tank outlet 212, or down the dip tube 205 already in place. In one embodiment a new dip tube 205 may be inserted that has a diffuser 250 located on the end of the dip tube 205. The diffuser 250 may be in the form of a brush 1300 (see FIG. 22), a flared plastic piece 1400 (see FIG. 24), or a screen 1500 (see FIG. 25) that fits into an inlet line or dip tube 205, is typically expandable at its end, and dissipates the force of incoming water and helps to distribute the incoming water gently into the lower tank section 202 of the water heater tank 201 without undue mixing of the tank contents.

Figure 10:
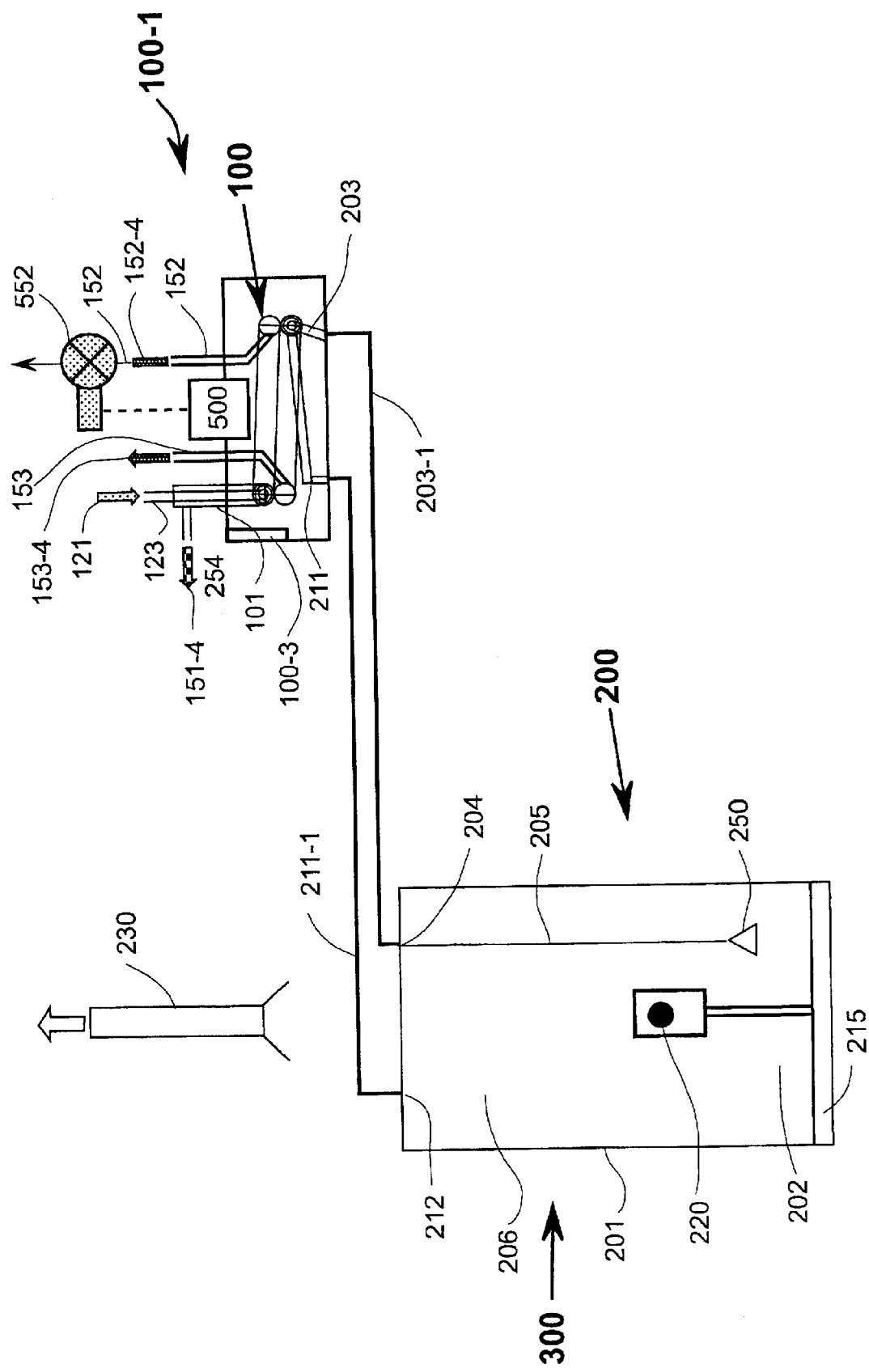
FIG. 10 depicts an embodiment where a counter-flow heat exchanger is located remote from the water heater.

An alternate mounting arrangement for the integrated water treatment system 300 would be to package the heat exchanger module 100-1 as a separate unit that is mounted on a wall, floor or ceiling near the water heater 200. FIG. 10 illustrates a typical mounting arrangement of this embodiment. A monitoring system 500, and one or more valves 552 (e.g. solenoid valves) as typically illustrated for second treated water outlet 152 may be used on additional outlets such as outlets 151, 153. Additional lengths of connecting lines 203-1 and 211-1 are used for connections between the two units, which may be insulated to reduce heat loss if desired. Preferably, the correct plumbing attachments are clearly identified by a label 100-3. Label 100-3 may be directly attached to the heat exchanger module 100-1 as shown or may be provided separately.

An alternative embodiment to that depicted in FIG. 9, involves winding the heat exchanger 100 in a coil around the outside of the water tank 201 rather than placing the heat exchanger over the top of the tank 201 or on a wall or the floor. This embodiment has the advantage of saving space. Typically the tank 201 and heat exchanger 100 would be encased in insulation from 1 inch (2.54 cm) to 4 inch (10.16 cm) thick so that the outside appearance of the combination would appear as one unit with a makeup water inlet and one or more treated water outlets at the top of the unit or at other selected sites.

Figure 11:
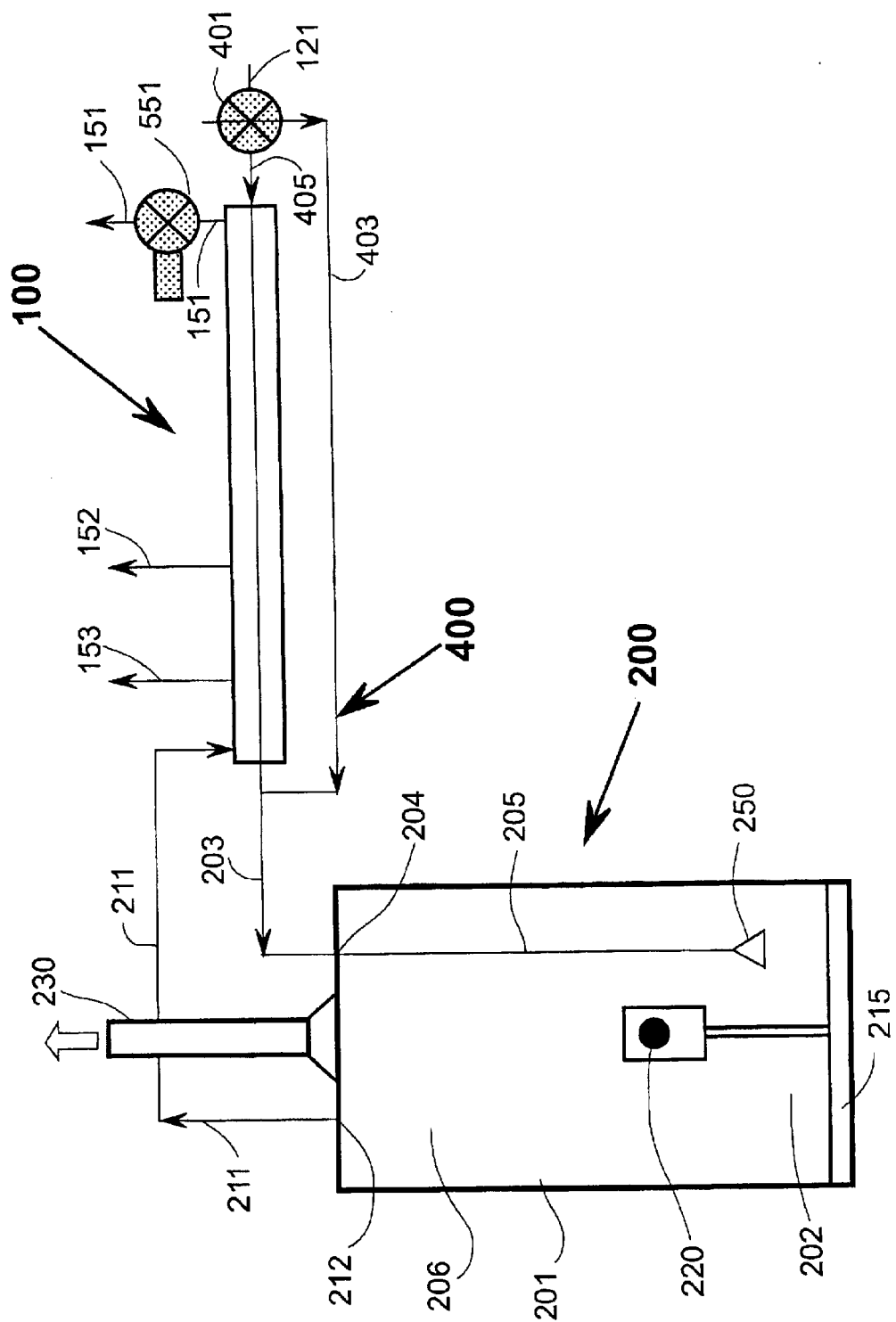
FIG. 11 is a schematic of an alternative embodiment of the invention depicted in FIG. 2 with the addition of a bypass loop 400 for periodically purifying all of the plumbing lines and fixtures.

Referring now to FIG. 11, this figure illustrates an embodiment that allows the periodic manual purification of all water lines and fixtures in a residence or commercial operation. It is known that certain types of organisms may initially or over time establish themselves in a water system. Chief among these is the organism *Legionella pneumophila* that causes occasional outbreaks of Legionnaires disease. *L. pneumophila* tends to establish itself and grow in any water outlet such as a shower head, faucet, water heater tank, and other outlet. It particularly prefers to grow in warm water below about 120° F. (49° C.). This temperature is that used at most mixed water withdrawals when showering, washing hands, etc. In addition, operation of the system of the invention beyond its rated draw output capacity may allow organisms to enter the residential or commercial water system. The addition of the bypass system 400 as shown in FIG. 11 will allow controlled purification of the entire water supply system at selected intervals.

The bypass loop purification system operates in the following fashion. To purify each of the water lines and their associated fixtures, the bypass valve 401 is activated so that incoming cold makeup water 121 is switched by bypass valve 401 to flow through bypass line 403 to bypass the heat exchanger 100 and flow directly to tank inlet line 203 and into the water heater tank 201 via dip tube 205. The individual faucets and fixtures in the residence or business (typical examples of a distribution system shown in FIG. 13) are opened one at a time or several at a time, or all are only slightly opened to allow the flow of a small amount of hot purified water, for a time determined to provide the thermal dose to inactivate the organisms in question. This will allow hot purified water from the water heater tank 201 (at about 140° F. to about 210° F.; at about 60° C. to about 99° C.) or up to the saturation temperature of the water) to flow directly through the heat exchanger 100, then out the first, second, and third treated water outlets 151, 152, 153 to the water distribution lines (see FIG. 13) without appreciable cooling. For inactivation of *L. pneumophila* in a relatively short time water temperatures of about 160° F. (71° C.), or higher, are recommended during at least the water line purification process. The high water temperature together with selected treatment time will purify the plumbing system. After the house or commercial system has been purified, the bypass valve 401 is rotated to allow the cold makeup water to again enter the heat exchanger 100 via connection line 405 and the flow to bypass system 400 is blocked. Then each of the residential or commercial water lines that are connected to the various purified water outlets (see FIG. 13) should be opened briefly to purge the hot water from the lines so no one will be scalded.

Figure 12:
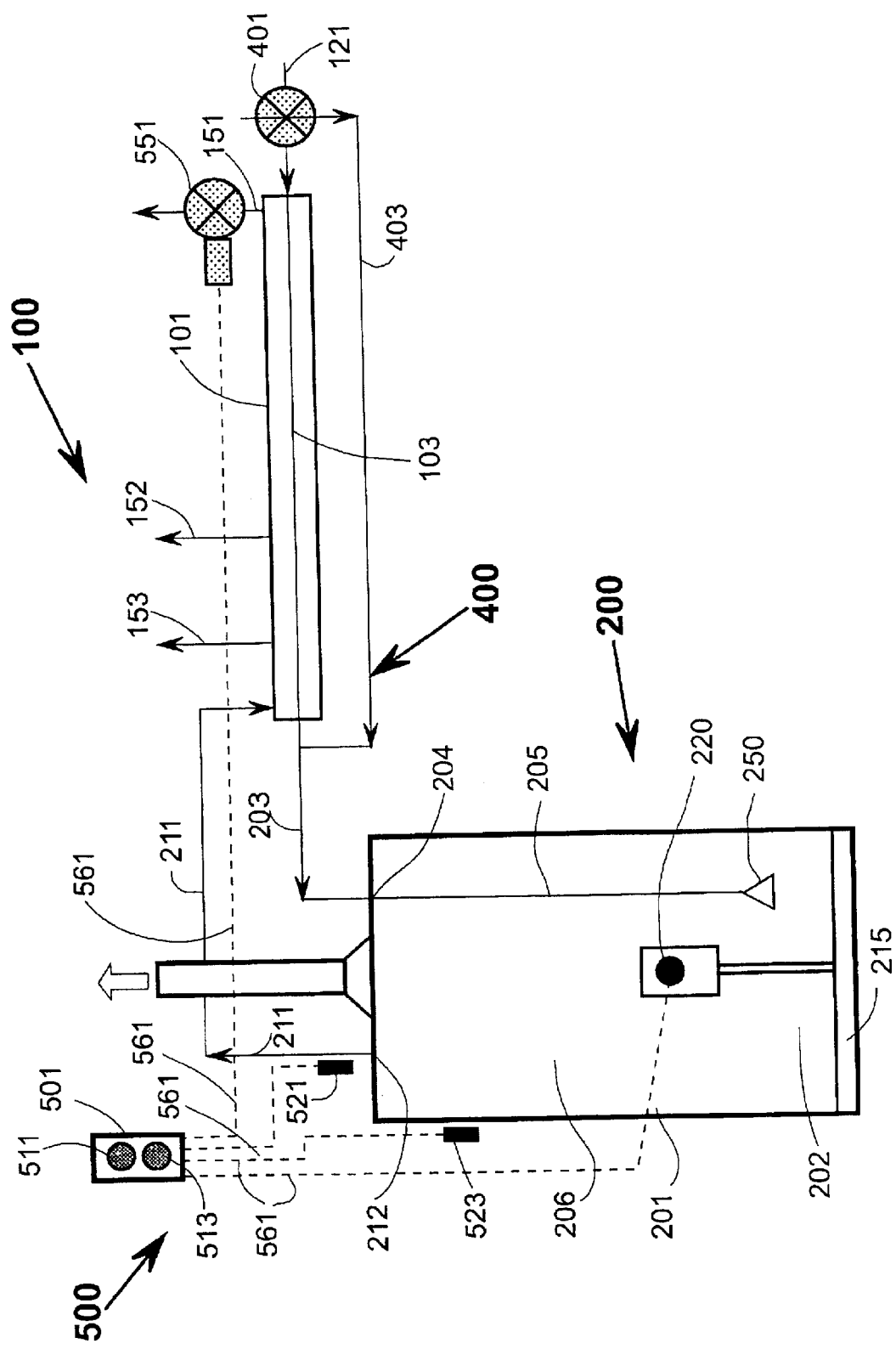
FIG. 12 is a schematic of an embodiment using a monitoring and control system 500 to alert the user to the depletion of treated water in the system and when safe conditions are restored.
Figure 14:
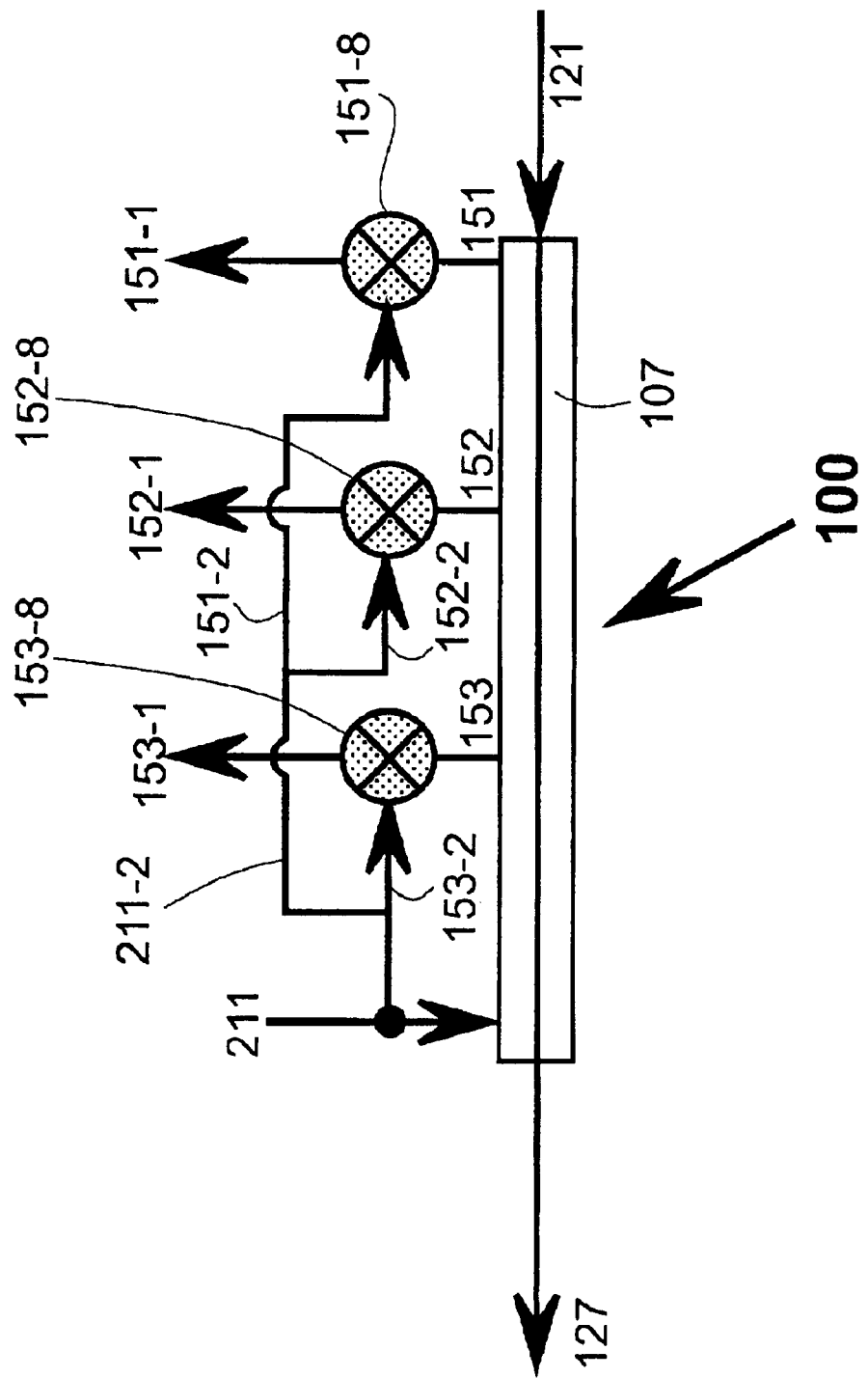
FIG. 14 is a schematic of an embodiment showing typical valving for supplying the hottest water to purify the supply lines in the system.

Referring now to FIG. 12, an additional embodiment of the invention includes the use of a monitoring and control system 500 to monitor and indicate to the user the status of the purified water. FIG. 12 shows the monitoring system 500 connected to an indicator 501, with two sensors 521, 523 placed on the tank outlet line 211 and the upper tank section 206 of water heater tank 201 respectively. Indicator 501 will indicate when the purified water is available, or when the temperature of the water at the tank outlet line 211 or top of the water heater tank 201 (or one or more other portions of the tank) has dropped below a predetermined set point, 140° F. (60° C.) for example, and the user should wait until the water heater tank 201 reheats before drawing additional drinking water. Another embodiment of the indicator 501 could be an indicator with a digital readout of one or more water temperatures in the tank, or other selected conditions. Another embodiment of indicator 501 typically includes one or more visual or aural signals 511, 513 to indicate the status of the system or water temperatures or conditions in the water heater tank 201 to the user. Typical visual signals such as a green light could be used for indicating that all conditions are proper, yellow could be used to indicate that purified water was running low, and red could be used to indicate that imminent contamination of the system could occur. Typical aural signals could be a bell or horn, or recorded or stored speech that informs the user of the particular problem encountered. The monitoring system 500 also could cause one or more valves 551 (e.g. solenoid valves) to close off and prevent further withdrawal of drinking water until the water heater tank had reheated and established the proper thermal dose conditions. The one or more valves 551 could be located as shown in FIGS. 11 or 14 to cut off the treated cold drinking water supply at first treated water outlet 151, or alternatively the solenoid could be located in the tank outlet line 211 of water heater tank 201 (not shown) to turn off all water exiting the water heater tank 201. The monitoring system 500 could also be set to keep system water flow off until the water heater tank 201 has fully reheated. Typically wiring 561 (which may be typical electrical or optical wiring or cables) is used to connect the various portions of the monitoring system 500 to sensors, valves, temperature controls and the like.

Figure 13:
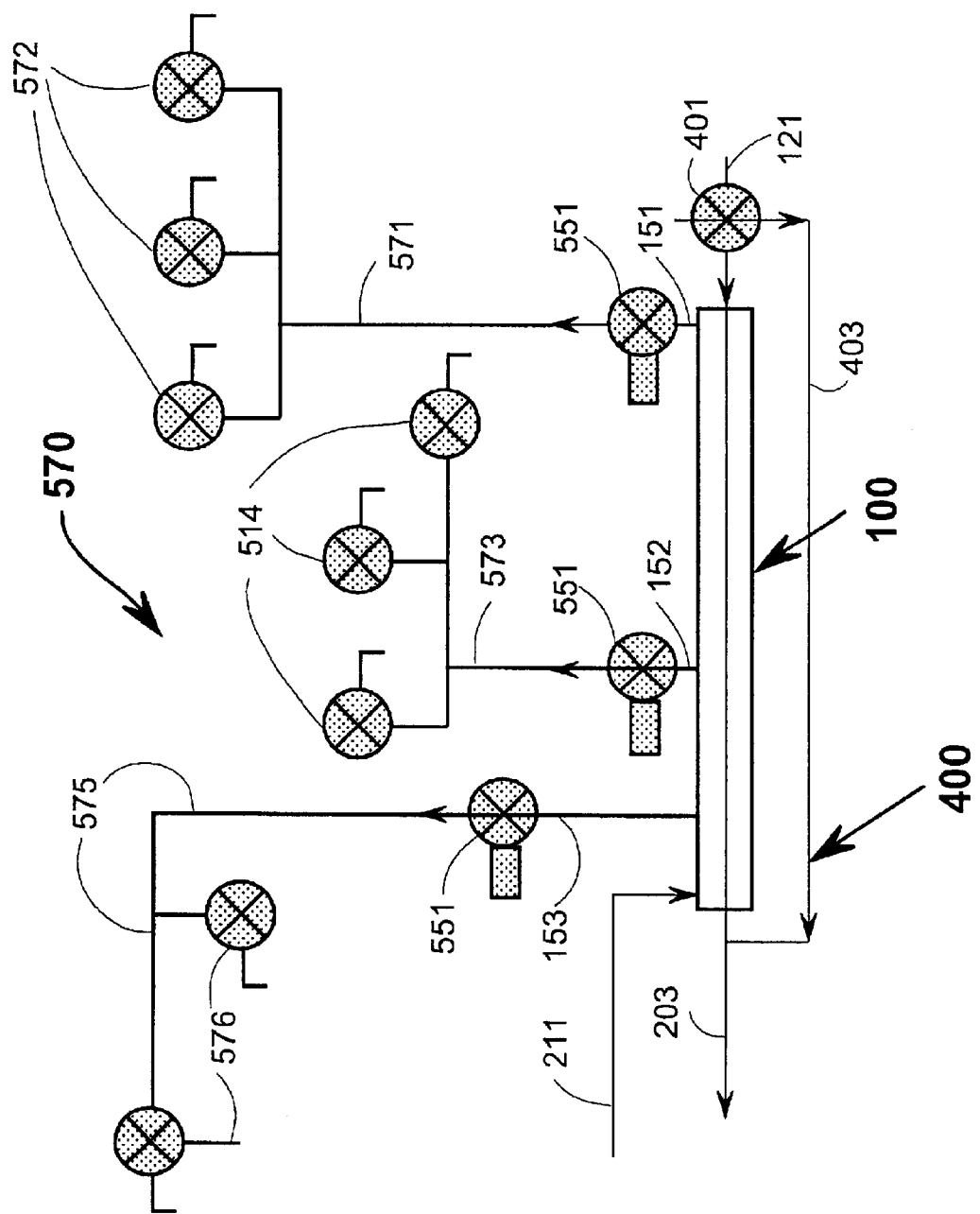
FIG. 13 is a schematic of an embodiment showing some of the plumbing and water line fixtures typically attached to the treated water outlets of the heat exchanger 100.

Referring now to FIG. 13, the heat exchanger 100 has a plurality of treated water outlets (typical first, second, and third treated water outlets 151, 152, 153 are shown) that are typically connected to one or more valves 551 (e.g. solenoid valves) for shutting off water flow when predetermined water purification conditions are not met. Distribution lines 571, 573, and 575 typically carry cold water, intermediate temperature water, and hot water, respectively, to fixtures 572, 574, 576. Distribution lines 571, 573, and 575 are typically metal (e.g. copper) or plastic (e.g. polyethylene or polybutylene). Plastic distribution lines are preferred because of plastic's typically lower heat conductivity in comparison to metal that aids in the purification of the water distribution system 570 as explained in more detail below. Water distribution system 570 includes the water lines and associated valves located beyond first, second and third treated water outlets 151, 152, and 153 on heat exchanger 100. If desired, selected sections of water lines in the water distribution system 570 may have outer insulation (not shown) to reduce cooling and thus aid in the purification process.

A detailed method according to the invention for purifying the water distribution system of the facility in which it is incorporated includes the steps outlined below. To this end, the method in one embodiment of the invention uses the apparatus according to FIG. 11 and FIG. 13, described in detail above. The first step in the method is to bypass the heat exchanger 100 and flow the incoming makeup water 121 directly into a tank inlet line 203 leading to the tank inlet 204 of the water heater 200 by way of bypass line 403. This may be accomplished by setting bypass valve 401 so that water cannot enter the heat exchanger 100, but now flows into bypass line 403. The incoming cold water replaces purified water in the water heater tank 201 that flows out of the water heater tank at tank outlet line 211 to the heat exchanger 100. Since no cooling water is passing through the heat exchanger 100 all of the purified water outlets from the heat exchanger 100 (exemplified by first, second, and third treated water outlets 151, 152, and 153) will be filled with hot water substantially at the outgoing water temperature from water heater 200 when individual faucets or fixtures are opened. Typical individual fixtures 572 (for cold water), fixtures 574 (for intermediate water temperature), and fixtures 576 9 (for hot water) are shown in FIG. 13. These fixtures are typically connected to valves 551 by distribution lines 571, 573, and 575 respectively. Each individual fixture in the water distribution system 570 is turned on for a predetermined time that will raise the temperature of the inside surfaces of the water lines and fixtures to that required to deliver a sufficient thermal dose to inactivate at least 99% or more of the target organisms. For example, now referring to FIG. 1, as discussed above, a typical and desirable target organism is Legionella pneumophila.

In the method a simple thermometer is all that is required. If desired, an automatically indicating thermometer with a light or sound indicator that responds when a certain time at temperature is obtained may be used. First, a water fixture or other outlet is typically turned on at a high flow rate (e.g. substantially fully open) and once hot water at the elevated temperature of the water heater tank emerges the water is allowed to flow over the thermometer or into a container with the thermometer until the temperature does not increase for a period of time (e.g. at least 15 seconds, 30 seconds, and preferably about at least 1 minute to five minutes), at which point the flow of water is turned off. The longer times providing greater assurance of elevating the inside of the water line and fixture to a temperature sufficient to achieve purification. All water will be flowing uncooled from the bypassed heat exchanger 100 and will typically be at temperatures at 140° F. (60° C.) or above, preferably 160° F. (71° C.) and above. After about a 1 to 15 minutes (typically at least 15 seconds or preferably 3–5 minutes) hold period the water is turned on again and the temperature of the first outflow is measured and the thermal dose determined for the selected degree of inactivation. If needed the flow is turned on until the selected thermal dose for the desired level of inactivation is achieved (e.g. Legionella, about 140° F. (60° C.) for about 15 minutes). If higher temperature water (e.g. 150° F. or 160° F.; 66° C. or 71° C.) is used the same procedure is used as for the 140° F. (60° C.) water. In the latter case for 160° F. (71° C.) water the thermal exposure period for inactivation of 99% of Legionella need only be about 3 minutes to a maximum of about 5 minutes. Thus, purification of the water distribution system is facilitated at higher temperatures.

Alternatively, instead of turning the system off after a stable temperature is achieved the water may be allowed to continue to flow at a reduced rate sufficient to provide hot water to the selected water outlet without significant cooling of the water line (e.g. about 0.6 gpm or 2.3 Lpm or more) until the selected thermal dose is achieved. A kit typically including directions, a thermometer, timer, and measuring container may be included with the device.

One or more of the fixtures 572, 574, 576 are then turned on in sequence and the water allowed to flow through the lines as outlined above until all of the fixtures and associated water lines (cold, intermediate and hot) are treated. After this thermal treatment, the water flow is set to no longer bypass the heat exchanger 100 by setting the bypass valve 401 back to its normal setting so that incoming water again enters and passes through heat exchanger 100.

Referring now to FIG. 14, this figure illustrates an alternate embodiment for purifying the supply lines in the plumbing system. FIG. 14 depicts this embodiment for three outlets 151, 152, 153 of a heat exchanger 100, however, the embodiment may be used with a heat exchanger having only one outlet 151, in which case line 211-2 would connect directly to three-way valve 151-8. Purification is obtained by valving the hottest water from tank outlet line 211 into the supply lines 153-1, 153-1, and/or 153-1 (usually at a lower temperature). The heat exchanger 100 may or may not be bypassed with bypass system 400. Three-way valves 151-8, 152-8, 153-8 control the flow of hot water to water supply lines 151-1, 152-1, 153-1 and prevent the flow of hot water through the heat exchanger 100. Hot water for purification flows to valve 153-8 by way of water lines 211-1 and 153-2 and is then valved to supply line 153-1. Hot water for purification flows to valve 152-8 by way of water lines 211-1, 211-2 and 152-2 and is then valved to supply line 152-1. Finally, hot water flows to valve 151-8 by way of water lines 211-1, 211-2, 151-2 and is then valved to water supply line 151-1. A disadvantage for this embodiment, when heat exchanger 100 is not bypassed, is that the hot water side of the heat exchanger 100 and first, second and third treated water outlet 151, 152, 153 are not purified.

If desired, the thermometer suggested herein for monitoring temperatures during the purification of supply lines may be replaced by a temperature sensor (not shown) that sends signals to the monitoring system 500 or control system 1610 (discussed in detail below). The temperature sensor may be connected by wires that are part of the control systems or may be portable or stand alone and communicate by electromagnetic radiation in the low to very high frequency ranges.

Figure 15:
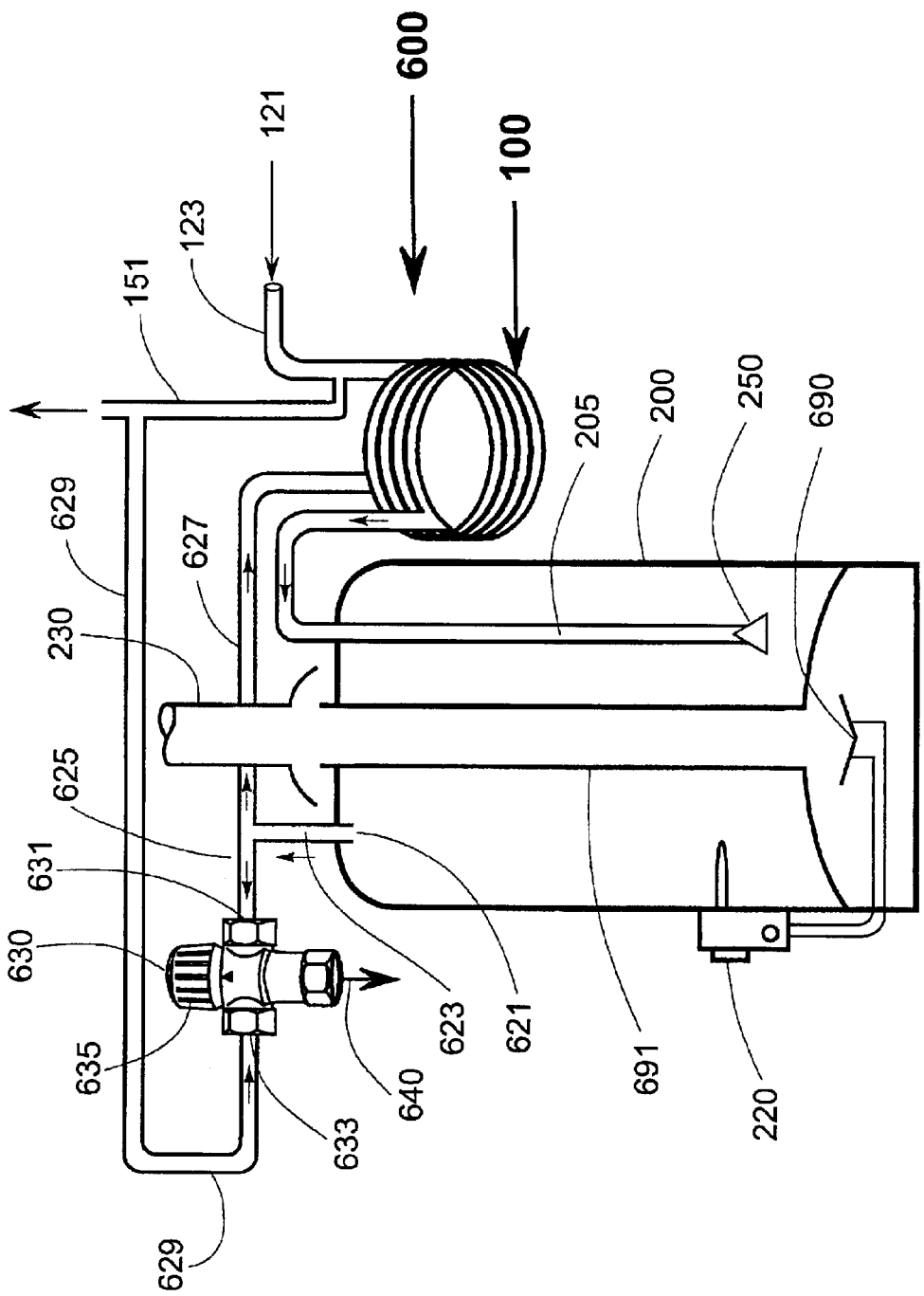
FIG. 15 is a schematic of a further embodiment of a residential or commercial water treatment system providing hot and cold treated water by means of a counter-flow heat exchanger and a mixing valve.

Referring now to FIG. 15, this figure illustrates another embodiment of the invention. FIG. 15 illustrates a treatment system 600 that requires only one treated water outlet (e.g. first treated water outlet 151) on the heat exchanger 100 that provides a supply of cold purified water. As in other embodiments the treated water may be conditioned or purified. In this embodiment, water heater 200 is typically a gas-fired water heater that has a center flue 691 for removing burned gases generated at burner 690, however, other modes of heating may be used. Treated hot water is provided at hot water outlet 621, where hot water line 623 carries the hot treated water to line 625 that connects to the hot water inlet 631 at mixing valve 630. Hot water line 627connects the hot treated water to the heat exchanger 100. The mixing valve 630 gets its cold treated water supply directly from first treated water outlet 151 via cold water line 629 at treated cold water inlet 633 and mixes the treated hot water from the water heater 200 with treated cold water from first treated water outlet 151 on the heat exchanger 100 to produce mixed treated, hot water 640. Treated hot water 640 typically flows from mixing valve outlet 641 to a hot water distribution system as described elsewhere herein. In this embodiment, the mixed treated hot water 640 at any selected outlet temperature will always be treated. That is because only treated hot and cold water is mixed at valve 630 in order to obtain an intermediate temperature. More than one mixing valve 630 can be used if multiple treated hot water temperatures are desired. Typically, the mixing valve 630 is adjustable over a temperature range (e.g. 110° F. to 145° F.; 43° C. to 63° C.) by turning the adjustment knob 635. An example of an acceptable anti-scald thermostatic mixing valve is a Honeywell-Sparco, Model AM101®.

Figure 16:
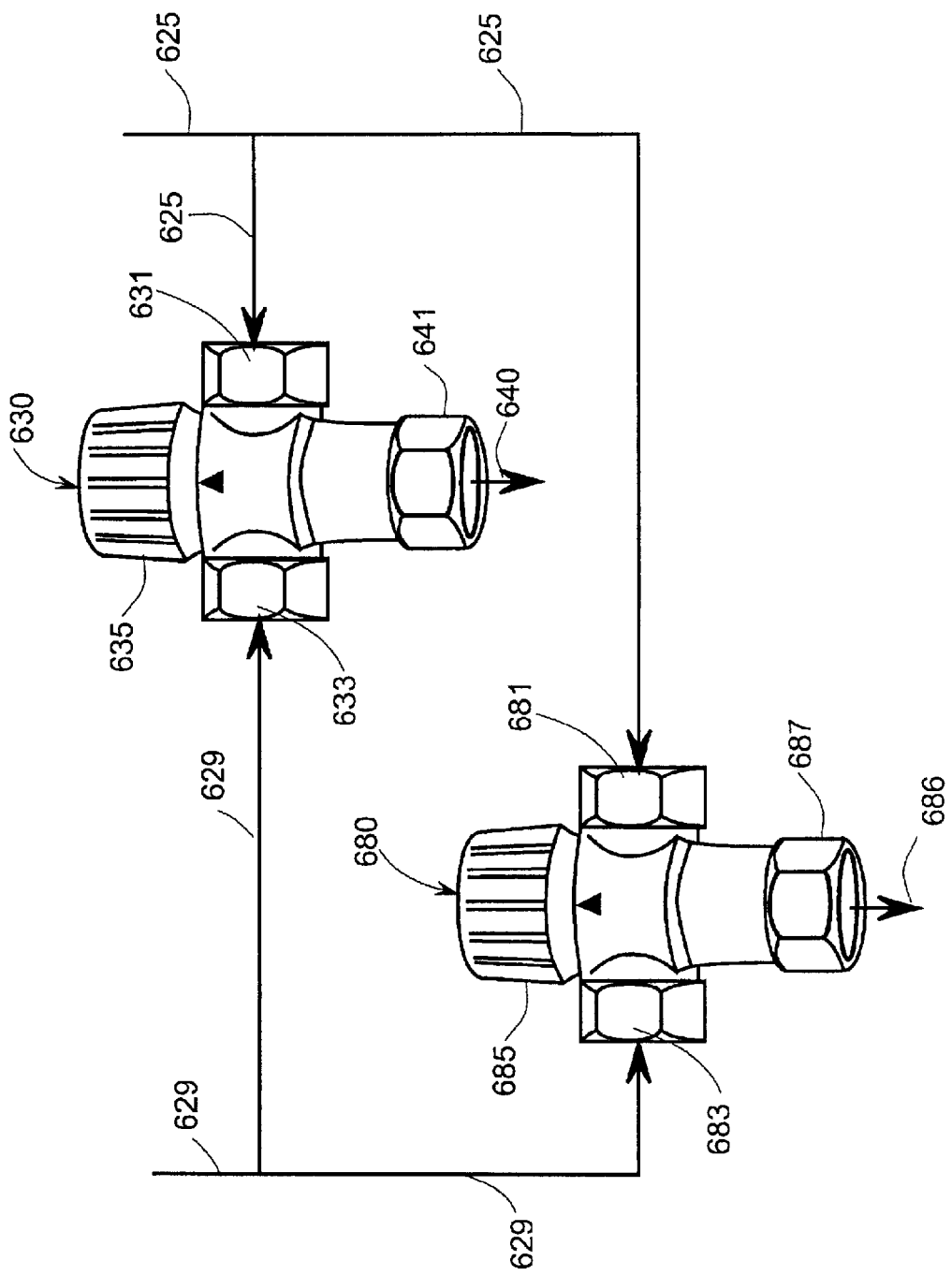
FIG. 16 is a schematic of an embodiment utilizing two or more mixing valves to supply additional treated hot water sources at various temperatures.

Referring now to FIG. 16, this figure illustrates an embodiment utilizing two or more mixing valves to supply several treated hot water temperatures for various uses. However, this embodiment still only requires one outlet 151 at the heat exchanger 100. A second mixing valve 680 is supplied by the same water supply as mixing valve 630, namely a treated cold water line 629, and a treated hot water line 625 that enters at inlets 681, 683. A different temperature for mixed treated hot water 640 is typically selected with adjustment knob 685. Treated hot water 686 typically flows from mixing valve outlet 687 to a hot water distribution system as described elsewhere herein.

Referring now to FIG. 17, this figure illustrates the use of a second tank to provide enhanced performance. This embodiment envisions the use of two tanks in series, with the first tank, water heater tank 201, used to heat the water to 140° F. (60° C.) to 210° F. (99° C.) or the saturation temperature of the water, for example, and the hot water tank 800 acting as a holding tank to assure that the water to be treated has the correct thermal dose of time at temperature. Water flows from water heater tank 201 to hot water tank 800 via line 803 into dip tube 805 to the tank. Tank outlet line 820 flows to the heat exchanger and/or distribution system as discussed elsewhere herein. Typically both tanks have a diffuser 250 to enhance stratification. Both water heater tank 201 and hot water tank 800 are typically water heaters, but water heater tank 201 could be gas-fired and tank 800 electrically heated, for example.

Referring now to FIG. 18, this figure illustrates a baffle system 900 for preventing mixing of water that has been heated for a longer time with water that has recently been heated. In one embodiment, the baffle system 900 is installed near the top of water heater tank 201 to deflect the upward flow of partially heated water and keep the top layer of treated water unmixed with the partially heated water. The baffle system 900 is typically made up of one or more baffles 901 that may be fixed to the water heater tank, or more preferably the baffle 901 may be a floating baffle with the correct density to separate the layers of water at different temperatures. Baffle 901 typically has a plurality of holes or slots 910 or other means to allow water to move from one side to the other. The baffle serves to prevent large scale vortex mixing of water from the volume below the baffle to the volume above the baffle. When a baffle 901 is used, the volume above the baffle 901 defines the volume where the water receives its thermal dose for effective inactivation of organisms. A fixed baffle design is particularly useful with a gas or oil-fired heater since the baffle would deflect the upward flow of heated water around the center flue 691 (see FIG. 15) while the burner 690 is on. A floating baffle uses the principle of reduction of the density of water as it is heated and its subsequent increase when cooled. The floating baffle could for example be selected to have weight equivalent to the density of the water it displaces at 150° F. (66° C.). As hot water is withdrawn, replenished and reheated in water heater tank 201 a floating baffle will rise up and down in the water heater tank 201; however, the water above the floating baffle will always be above the selected temperature, in this case 150° F. (66° C.). Thus the baffle helps ensure that the water above the baffle 901 is adequately treated.

Figures 19, 20, 21:
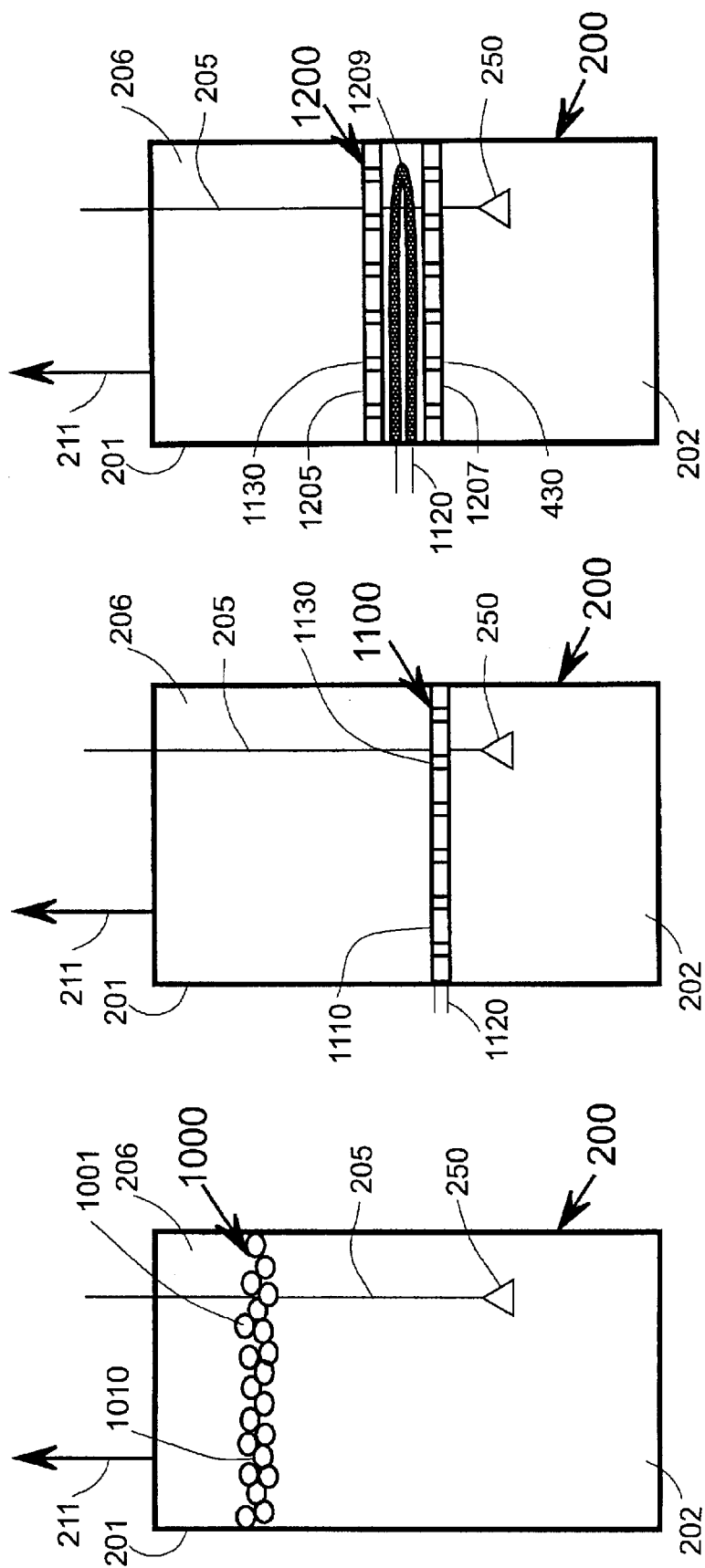
FIG. 19 is a schematic of another embodiment of the invention depicting floats 1010 such as spheres that form a baffle at some selected water density.
FIG. 20 is a schematic of another embodiment of the invention depicting a heated baffle system 1100.
FIG. 21 is a schematic of another embodiment of the invention depicting a different heated baffle system 1200 that uses two fixed baffles with a heater positioned between the baffles.

Referring now to FIG. 19, this figure illustrates an alternate floating baffle system 1000 made up of a floating barrier 1001 formed from a multitude of individual floats 1010. The floats 1010 would have properties similar to the floating baffle described above except that the alternate floating baffle system is formed of discrete floats that allow heated water to pass between them. The floats 1010 are also selected to rise and fall with the density of water at a particular temperature. An advantage of the floats is that they can easily be retrofitted to an existing water heater tank by insertion through the dip tube 205, or the tank inlet 204 or tank outlet 212 openings. Floats 1010 may be spherical, ovoid, cubic, star shaped, or randomly shaped. A major consideration for floats 1010 is that together as a group they provide a barrier that impedes mixing and enhances stratification. Floats 1010 are preferably of a rigid material that maintains its density over temperature and pressure variations. Floating barrier 1001 formed by floats 1010 will rise and fall according to the density of the surrounding water. One or more floating barriers 1001 may be within the same tank depending on the density selected for the multiple floats 1010. An advantage of the floats 1010 over a rigid floating baffle is that the floats will be free to move and not bind especially if there are deposits on the sides of the tank.

Referring now to FIG. 20, this figure illustrates a heated baffle system 1100 that effectively provides a two-tank effect within one tank. The baffle effectively prevents mixing of water that enters at the bottom of the tank (or water that has recently been heated in the lower tank section 202) with water that has been heated for a longer time above the heated baffle system 1100 in upper tank section 206. The heated baffle system 1100 is installed at any level of the water heater tank that provides the desired properties. Preferably when only one heated baffle is used the heated baffle 1110 is installed in the lower half to lower third of the water heater tank to assure a large volume of longer term heated water above the heated baffle 1110. Physically the baffle functions as does the non-heated baffle described above; however, any water flowing through the openings in the heated baffle system 1100 is now subject to additional heating. The heated baffle system 1100 is typically made up of one or more heated baffles 1110 that are typically fixed to the water heater tank and connected to a source of energy via electrical connections 1120. Heated baffle 1110 typically has a plurality of openings 1130 such as holes, slots, and the like or other means to allow water to move from one side to the other in a controlled manner. The heated baffle serves to prevent large-scale mixing of water from the volume below the baffle to the volume above the baffle. The heated baffle also serves to bring any water entering the upper tank section 206 through the heated baffle up to the temperature required in the upper tank section. In one embodiment, when a heated baffle 1110 is used, the volume above the heated baffle 1110 typically defines the volume where the water receives its thermal dose for effective inactivation of organisms. A fixed heated baffle design is particularly useful with a gas or oil-fired heater since the baffle would deflect the upward flow of heated water around the center flue 691 (see FIG. 15) while the burner 690 is on and provide its own heating effect across the cross section of the tank where it is located. The baffle should have small openings and be of such thickness and of such materials typically used with submerged heaters so that the water flowing there through has sufficient contact and residence time that the water can be effectively heated. In this context it is important to note that the incoming water in the lower tank section 202 will have been heated by the heat exchanger and some portion will have been heated by the heater in the lower portion of the tank. Therefore, the temperature for the upper tank section only needs to be increased by about 5° F. (2.8° C.) to about 30° F. (16.7° C.) to achieve a greatly enhanced thermal effect.

The water heater tank 201 may contain additional areas where the water is heated For example, with an electrically heated tank, another embodiment of the invention includes an additional electrical heater element (and associated thermostat), not shown, at the upper tank section to help maintain that water at a high or higher temperature without the need to obtain the additional energy from a lower located heated baffle or lower electrical heater element. Alternatively, when using a heated or non-heated baffle, an additional heating element and associated thermostat, not shown, could be at or above the heated or non-heated baffle but close to it in proximity.

Referring now to FIG. 21, alternatively, a heated baffle system 1200 may be made of two unheated baffles 1205, 1207 in close proximity with a heater 1209 and typically a thermostat located between them. The baffles 1205, 1207 in this case would be mounted within several inches of either side of heater 1209, preferably within about one half to four inches and most preferably within about one half to two inches. Openings 1130 allow for flow from one side of the baffle to the other. Baffles 1205, 1207 are typically fixed, but one or both may be allowed to move between the restricted ranges of one to four inches or one to two inches.

Figure 23:
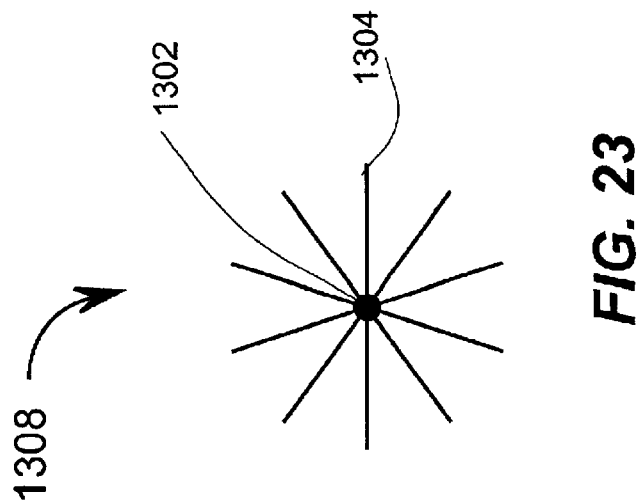
FIG. 23 is a cross section view at section 23—23 of the brush diffuser 1300 of FIG. 22.
Figure 22:
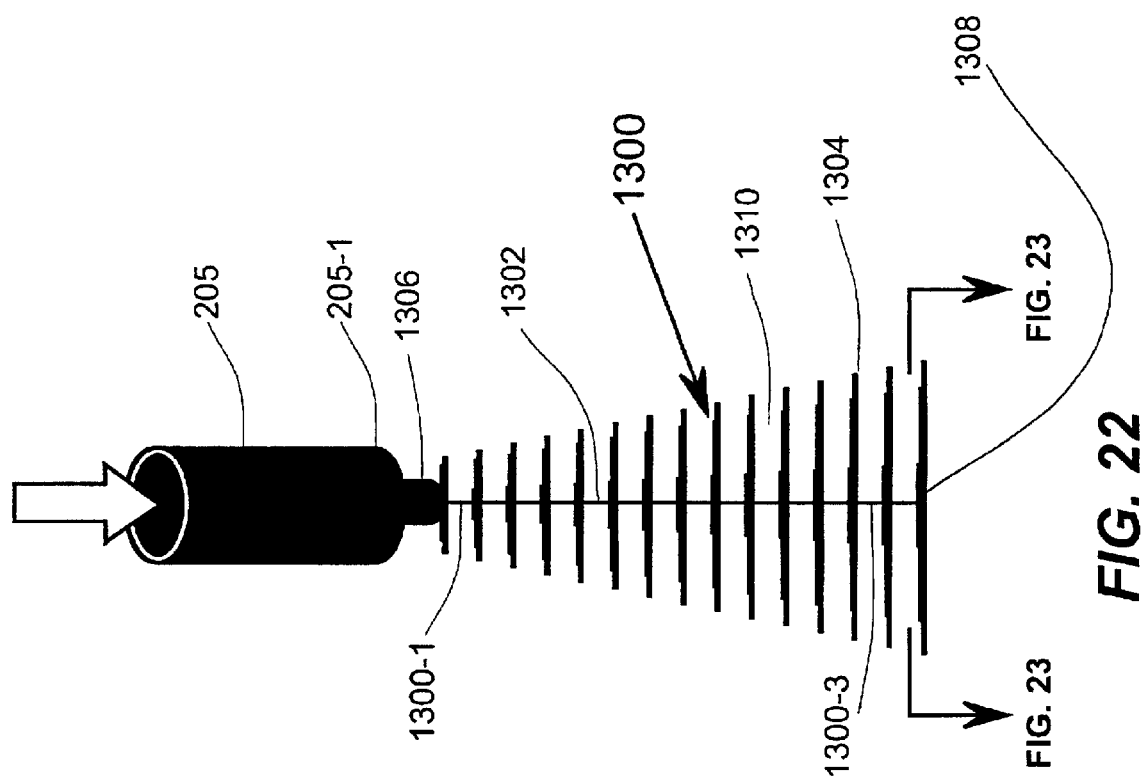
FIG. 22 is a schematic of a brush diffuser 1300 for reducing water velocity from an inlet line or dip tube to minimize mixing in a tank.

Referring now to FIGS. 22 and 23, a brush diffuser 1300 can be located at the outlet 205-1 of dip tube 205 to reduce the velocity of incoming water so that the velocity of incoming water will not cause as much mixing of cooler incoming water with heated water so that the water heater tank will remain more stratified. Brush diffuser 1300 typically has a support 1302 on which bristles 1304 are mounted. A mounting 1306 holds the diffuser 1300 to the dip tube 205 with support 1302. Diffuser 1300 typically is 2 inches (5.08 cm) to 7 inches (17.8 cm) long and may have a series of bristle layers 1308. Spacing 1310 between the bristle layers 1308 may be from about 0.1 inch (0.254 cm) to about 1 inch (2.54 cm). The number of bristle layers 1308 is typically from five to twenty. Each bristle layer 1308, as depicted in FIG. 23, may have from two to twenty individual bristles 1304, preferably five to fourteen. The bristle 1304 diameter is typically between about 0.25 mm to about 3 mm. Bristle length may be from 0.5 inch (1.27 cm) to six inches (15.2 cm). Typically, the bristles 1304 are pliable, particularly when used in a retrofit system where the brush diffuser 1300 is inserted and deployed through a small opening or the dip tube 205. The brush diffuser 1300 may be tapered as shown, from upper portion 1300-1 to lower portion 1300-3 or may have other shapes and bristle lengths such as bristles of random or equal lengths. FIG. 23 shows a typical cross section 23—23 of the brush diffuser 1300.

Figure 24:
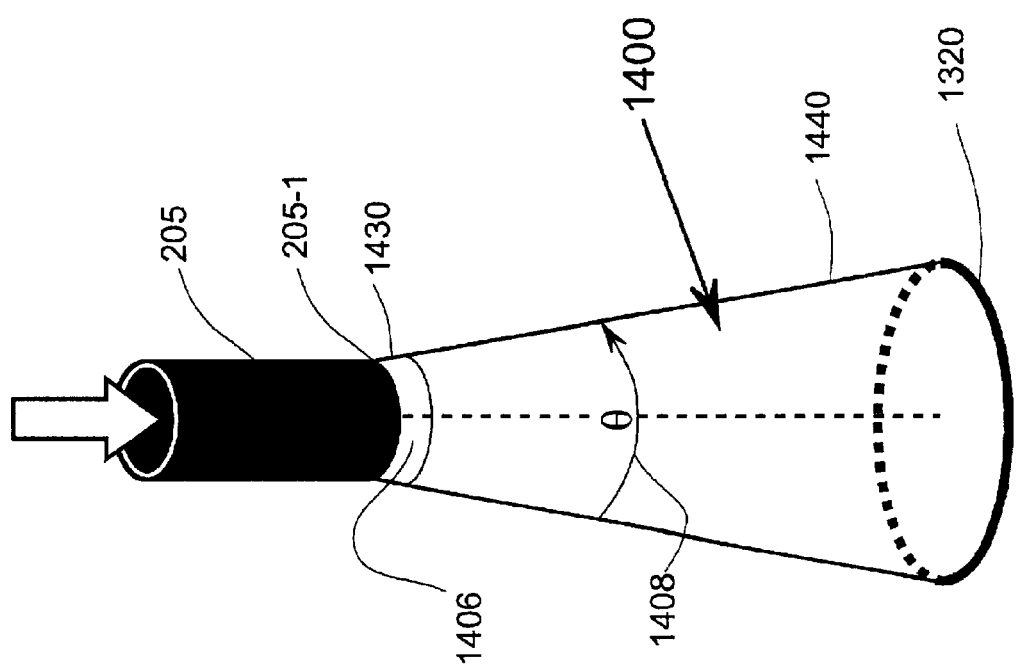
FIG. 24 is a schematic of a flexible plastic or rubber flared flexible cone diffuser 1400 for reducing water velocity from an inlet line or dip tube to minimize mixing in a tank.

Referring now to FIG. 24 which depicts another diffuser embodiment, a flexible cone diffuser 1400 can be located at the outlet 205-1 of dip tube 205 to reduce the velocity of incoming water and reduce mixing and maintain stratification. A mounting 1406 typically at the apex of the flexible cone holds the flexible cone diffuser 1400 to the dip tube outlet 205-1. Typically, the flexible cone shaped diffuser 1400 has a spread defined by angle θ 1408. Angle θ 1408 may be about 7° to about 30°. Preferably, the angle θ 1408 is about 7° to about 15°. The resulting outlet opening 1420 depends on the length of the conical shape in inches (cm) and the spread of the flexible cone in degrees. The diameter of the inlet opening 1430 at the apex of the flexible cone is determined by the diameter of the dip tube 205 or the inlet size and is typically about 0.5 inch to about 1.0 inch (1.3 cm to 2.54 cm). The flexible cone material 1440 is typically plastic, rubber or some other flexible material. Flexibility is particularly important for use with a retrofit system where the flexible cone diffuser 1400 is inserted or deployed through a small opening or the dip tube 205.

Figure 26:
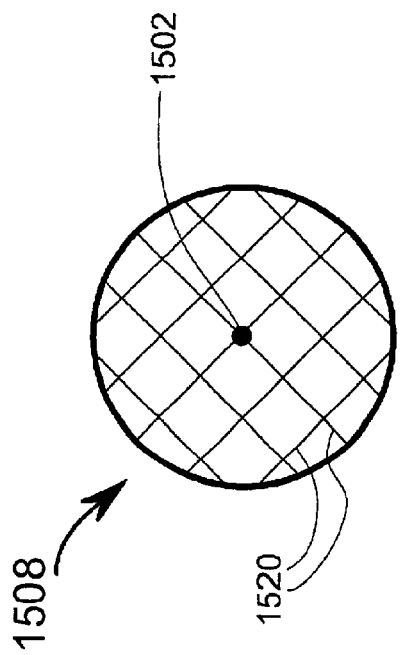
FIGS. 26 and 27 are cross section views of two typical embodiments at section 26/27—26/27 of the screen diffuser 1500 of FIG. 25.
Figure 27:
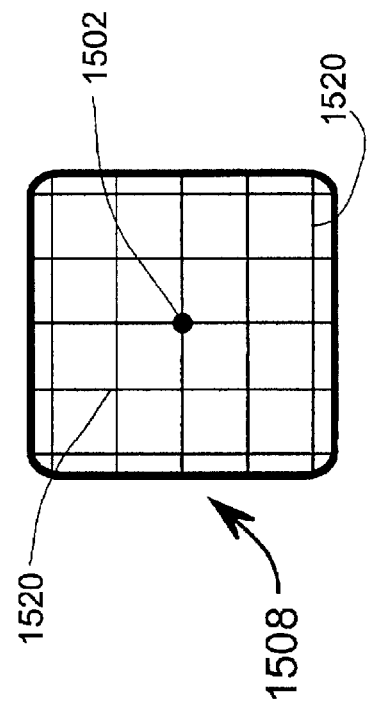
Figure 25:
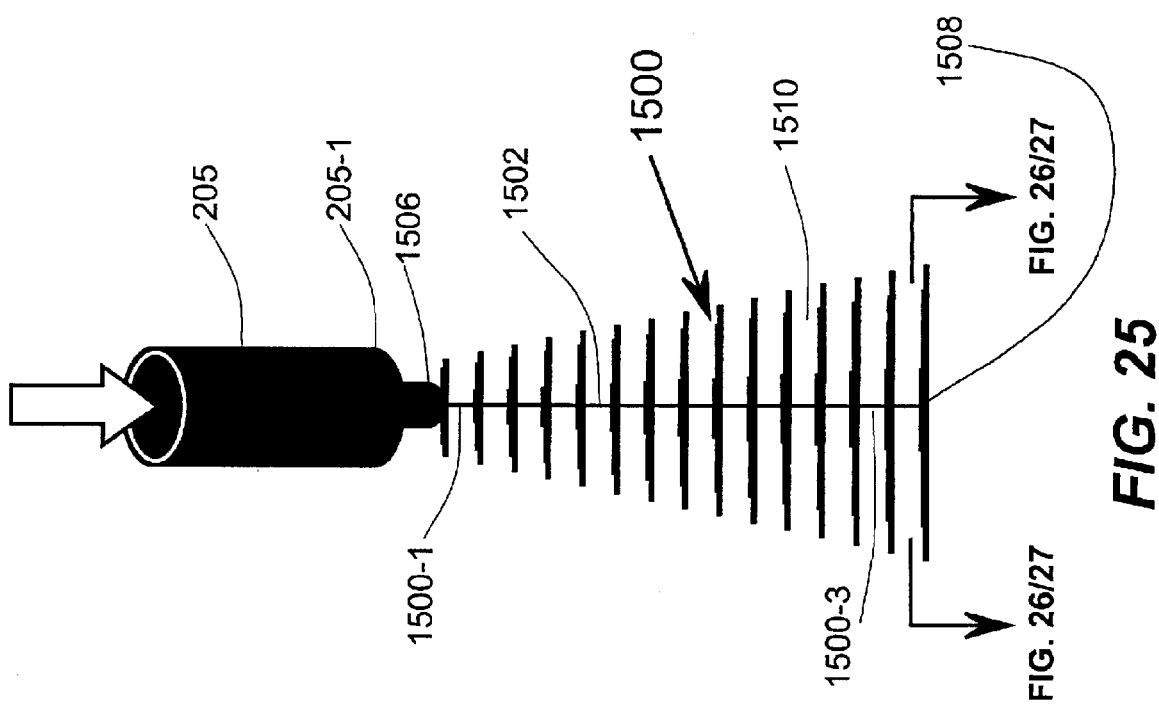
FIG. 25 is a schematic of a screen diffuser 1500 for reducing water velocity from an inlet line or dip tube to minimize mixing in a tank.

Referring now to FIG. 25, this figure depicts a screen diffuser 1500 for reducing the velocity of water from dip tube outlet 205-1. Screen diffuser 1500 typically has a support 1502 on which a plurality of screens 1504 are mounted. One or more supports 1502 may be used. A mounting 1506 holds the diffuser 1500 to the dip tube 205 with support 1502. Screen diffuser 1500 typically is 2 inches (5.08 cm) to 7 inches (17.8 cm) long and may have a series of screen layers. Spacing 1510 between the screens 1504 may be from about 0.1 inch (0.254 cm) to about 1 inch (2.54 cm). The number of screens is typically from two to twenty. Each screen 1504 is made up of wires or filaments 1520 that may be woven or randomly interlocking. Wires or filaments 1520 may be metallic, plastic, or fibrous. The individual wire diameter is typically between about 0.25 mm to about 3 mm. Typically, the screens 1504 are pliable, particularly when used in a retrofit system where the screen diffuser 1500 is inserted and deployed through a small opening. The screen diffuser 1500 may be tapered as shown from upper portion 1500-1 to lower portion 1500-3, or may have other shapes and screen diameters of random or equal lengths. The screens may be circular or rectangular or square as depicted in FIGS. 26 and 27. Diameter or edge length of the screens may vary from about 0.25 inches (0.64 cm) to about six inches (15.2 cm). FIG. 26 illustrates a circular embodiment of screen diffuser 1500 along a cross section 23. FIG. 27 illustrates a rectangular or square embodiment of screen diffuser 1500 along a cross section 23.

As an alternative to the above diffusers, a further embodiment of a diffuser includes a porous network (not shown in the figures) having sufficient porosity to receive and discharge at least 2.5 gpm (9.5 liters) of water entering a tank and slowing the velocity of the water. The porous network is typically mounted on a support to an inlet pipe or dip tube 205.

Figures 28, 29:
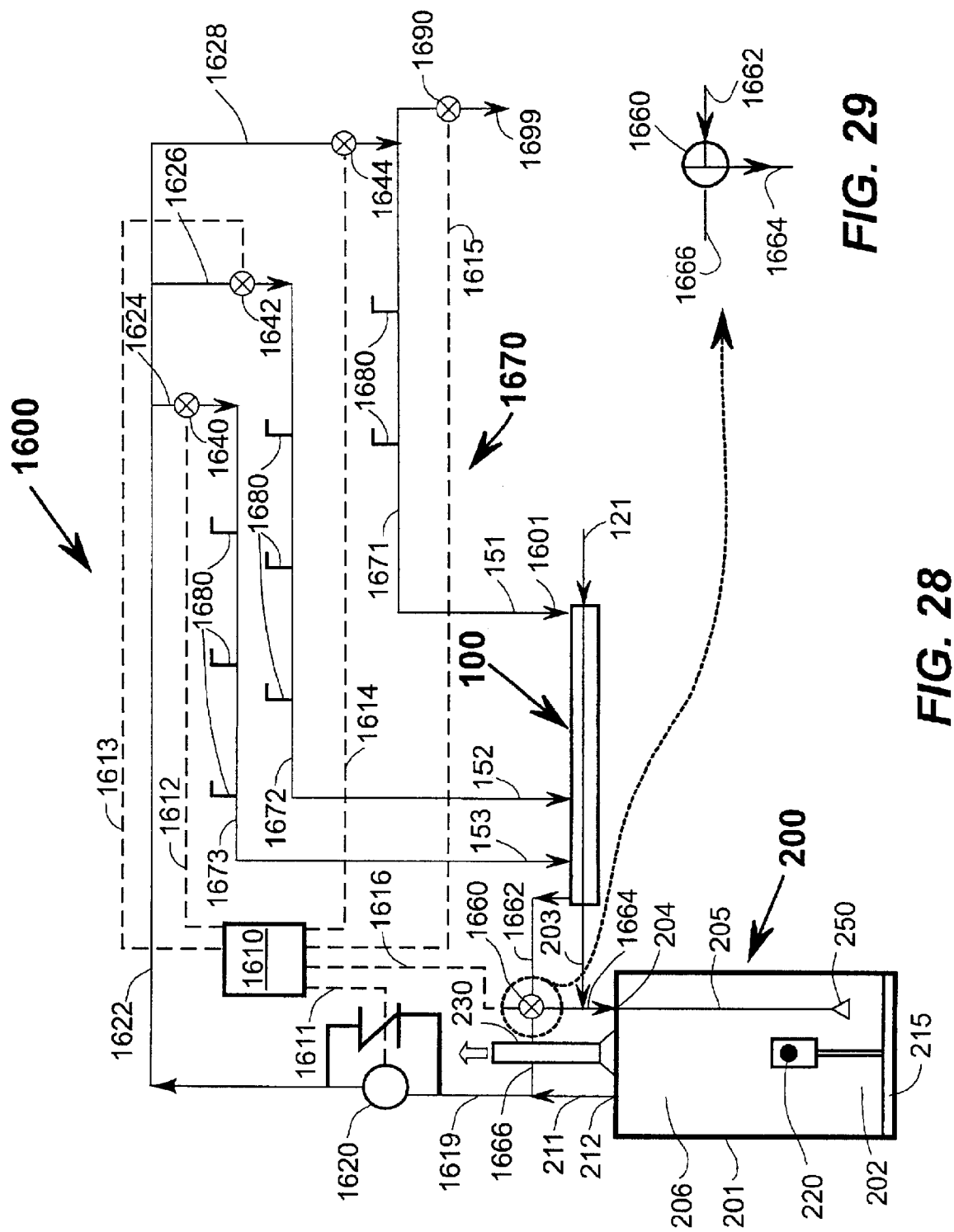
FIG. 28 is a schematic of a purification loop illustrating a three-way valve 1660 setting for purification of the water system.
FIG. 29 is a more detailed schematic of a three-way valve 1660 set at a purification setting according to the invention.

Referring now to FIG. 28, this figure depicts a purifying circulating loop system 1600 that has been adapted to the apparatus of FIG. 2 and where the heated water can circulate within a water distribution system 1670 for enhanced purification of water lines and fixtures 1680. Although adapted to FIG. 2, the purifying loop system could be applied to other embodiments as will be apparent to those skilled in the art, once knowing the teachings herein. The valve setting for valve 1660 for purification is shown greater detail in FIG. 29. The arrows 1601 (only one is labeled for clarity) depict the direction of water flow during purification. Control system 1610 provides for starting and stopping of pump 1620 and control of on-off valves 1640, 1642, 1644, 1690 and three way valve 1660 via signal control lines 1611, 1612, 1613, 1614, 1615, and 1616 respectively. Pump 1620 provides power to circulate the heated water from the tank outlet 212 throughout the water distribution system 1670. Pump 1620 is typically a magnetic drive hydronic heating pump or hydraulic circulation pump, exemplified but not limited by pumps such as those manufactured by TACO Inc., Cranston, R.I. USA; Grundfos Pumps Co., Fresno, Calif., USA, or Gorman-Rupp Company, Mansfield, Ohio, USA. In the embodiment shown in FIG. 28, heated water flows from the tank outlet 212 through tank outlet line 211 and line 1619 to the pump 1620. The water is then pumped though recirculation line 1622 to on-off valves 1640, 1642, 1644 via connection lines 1624, 1626, 1628 respectively. On-off valves 1640, 1642, 1644 may be individually turned on or all may be turned on at once to provide flow for each distribution line 1671, 1672, 1673 of the water distribution system 1670. Note that the on-off valves 1640 to 1644, and 1690 are all off during normal operation of the water distribution system 1670 and are only turned on for purification purposes. After flowing backwards through distribution lines 1671, 1672, 1673 the heated water flows into heat exchanger 100 via first, second, and third treated water outlets 151, 152, 153 respectively. After flowing through the heat exchanger 100 the water flows through line 1662 through 3-way valve 1660 into line 1664 and thence into the tank inlet 204 of water heater 200.

During purification of the water distribution system 1670 the water distribution system 1670 will continue to be purified with hot water with no need for makeup water even when none of the fixtures 1680 are turned on. Although one or more fixtures could be turned on, at the start of the purification process it is preferred that all of the lines be purified for a selected time prior to opening any fixtures 1680. This will assure that all of the water lines leading to the fixtures 1680 will have been purified. Once the water distribution system 1670 has been purified, the fixtures 1680 may be turned on (as described previously) for a sufficient time to provide the selected thermal dose to purify the particular fixture 1680.

FIG. 30 depicts the direction of water flow during normal operation. The setting for three-way valve 1660 for normal operation is shown in greater detail in FIG. 31. After the purification procedure is over, control system 1610 is returned to its normal setting so that valve 1660 is set as in FIG. 31 and on-off valves 1640, 1642, 1644 are turned off. Next, in order to prevent scalding, valve 1690 (typical) located at the end of any cold water lines such as 1671 is turned on by control system 1610 and water allowed to flow to drain 1699 for a selected time until cooler water has replaced the hot water in the lines. Valve 1690 is then turned off and normal operation of the system is again established. If desired, for improved efficiency, the drain water from valve 1690 could be returned to the tank inlet 204 of water heater 200 via a line (not shown). During normal operation water from the tank outlet 212 of water heater 200 flows through line 211 to line 1666 through 3-way valve 1160 as shown in FIG. 31 and then to the heat exchanger 100 for distribution to the water distribution system 1670 in the herein described manner via heat exchanger first, second, and third treated water outlets 151, 152, 153.

Figure 32:
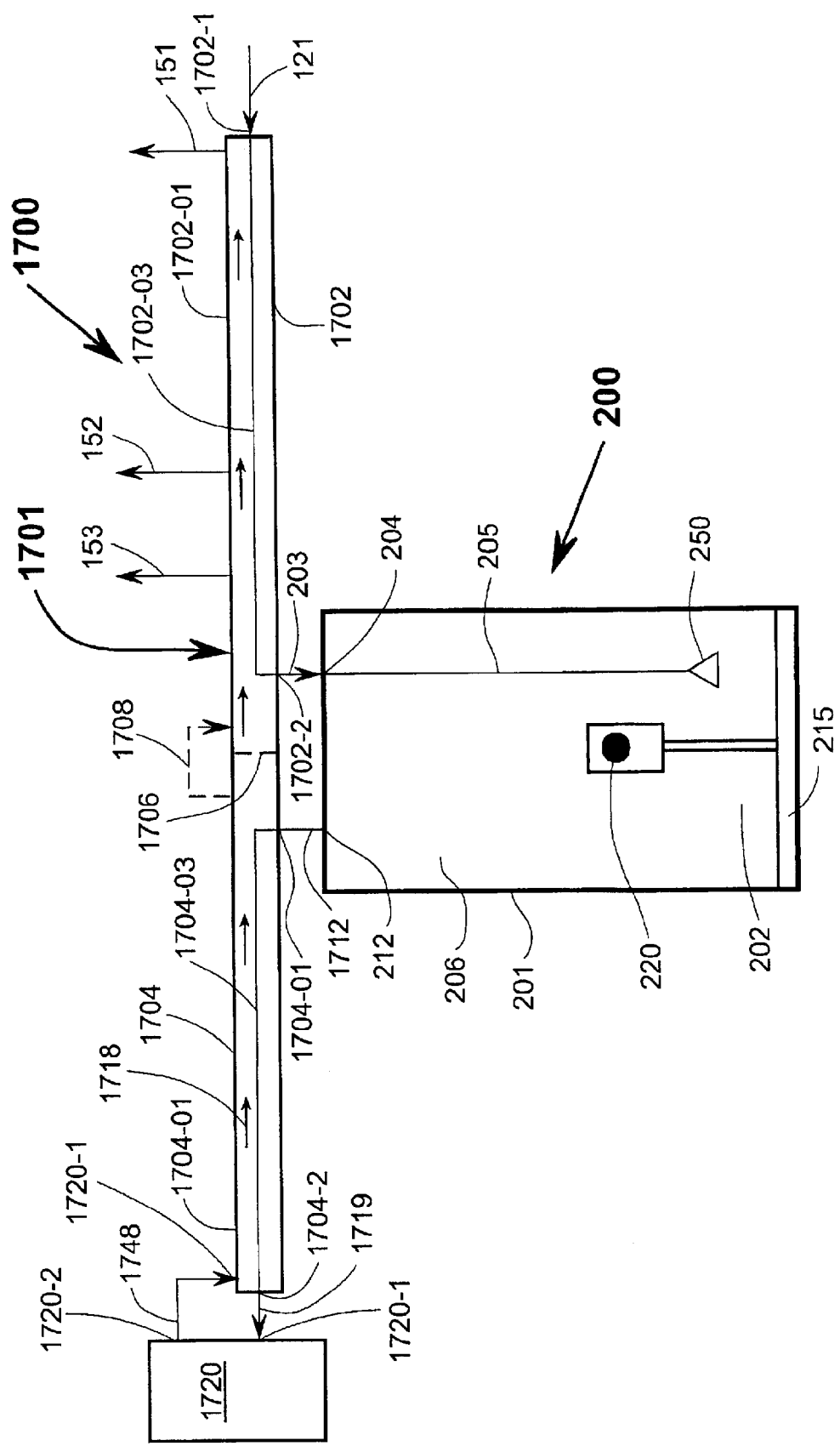
FIG. 32 is a schematic of an embodiment utilizing an auxiliary heater 1720 and a two-part heat exchanger 1700 or two separate heat exchangers.

Referring now to FIG. 32, this figure illustrates another embodiment of the invention, a high thermal dose system 1700, that uses a two part heat exchanger 1701 (or the two part heat exchanger 1701 may be separated as further described below) and an auxiliary heater 1720 to provide higher thermal doses in a short period of time than those available from a tank system alone, yet has the high water flow characteristics of a tank. The high thermal dose system 1700 achieves this result by use of the first heat exchanger section 1702 and second heat exchanger section 1704 that function in a similar manner as heat exchanger 100 discussed previously. The heat exchanger sections extract heat from water heated by a water heater 200 and an auxiliary heater 1720.

In operation, makeup water 121 enters first heat exchanger section 1702 at inlet 1702-1 to inner tube 103 and flows through outlet 1702-2 via inlet line 203 to the inlet 204 of the water heater tank 201 of water heater 200. The water flows down the dip tube 205 and through an optional diffuser 250. The water is heated in the water heater tank 201 by heater 215. Optional heated and unheated baffles, controls, bypass means and other auxiliary devices described elsewhere herein that enhance stratification and/or enhance heating of incoming water may be used. Heated water then exits the water heater tank 201 at tank outlet 212 and flows through line 1712 to an inlet 1704-1 to an inner tube 1704-03 of the second heat exchanger section 1704, out of outlet 1704-2 to line 1719 and then to the inlet 1720-1 of auxiliary heater 1720. The water from the water heater tank 201 is heated above the temperature of the water flowing from the water tank 201 first by heat extracted in second heat exchanger section 1704 and then by auxiliary heater 1720. The heated water exits auxiliary heater 1720 at outlet 1720-2 to line 1748 and enters inlet 1720-1 to the outer tube 1704-01 of second heat exchanger section 1704 where heat is extracted into water flowing from the water heater tank 201 now in inner tube 1704-03. Arrow 1718 (typical) shows the water flow in outer tubes 1702-01, 1704-01. The water in outer tube 1704-01 continues to flow to first heat exchanger section 1702 where additional heat is extracted into incoming makeup water 121 in inner tube 1702-03 as the treated water continues to flow within outer tube 1702-01. Treated water then exits the first heat exchanger section 1702 at first, second, and third treated water outlets 151, 152, 153 for distribution to a water distribution system as discussed elsewhere.

Figure 33:
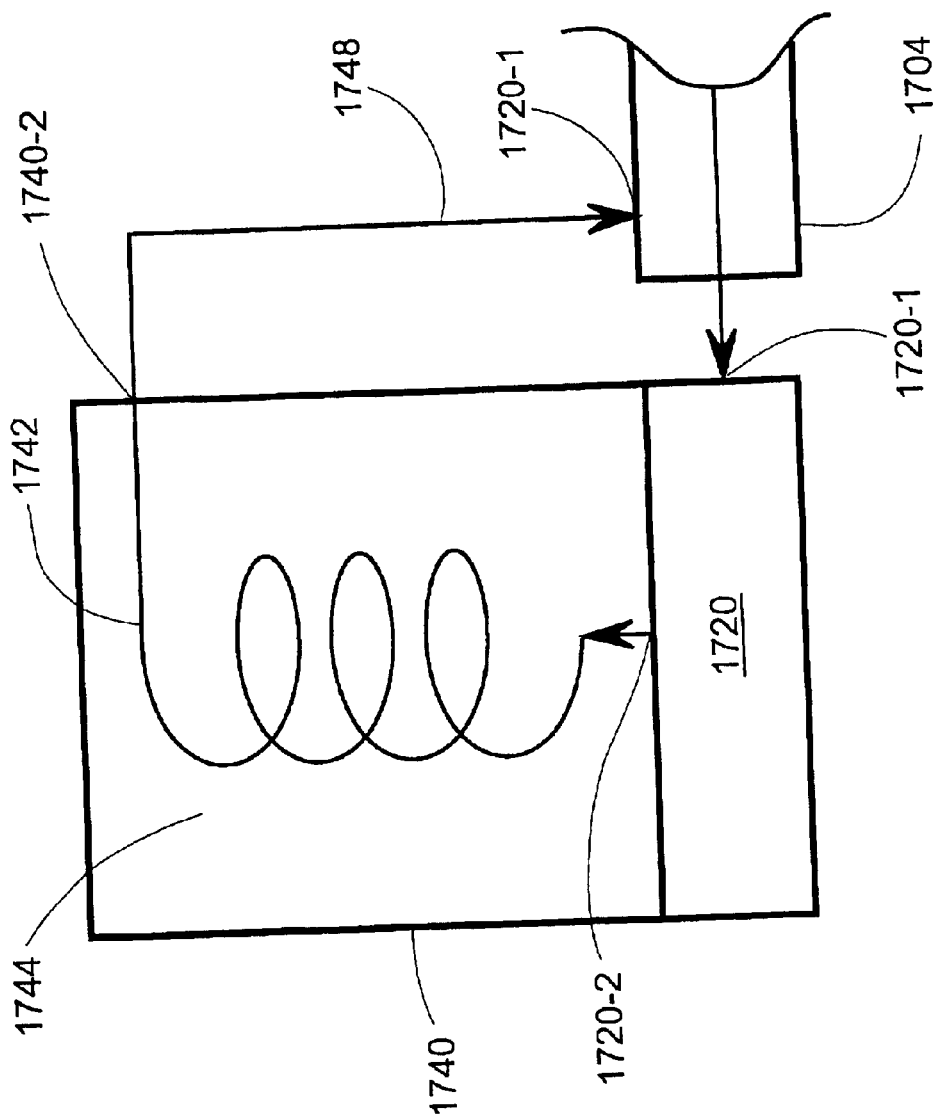
FIG. 33 is a schematic of a further embodiment of the invention according to FIG. 32, wherein a delay line 1742 provides increased residence time for water to achieve a selected thermal dose.

Referring now to FIG. 33, this figure is a schematic of a further embodiment of the invention with the portion to the right of FIG. 32 cutaway. Here thermal dose enhancer 1740 is used to increase the thermal dose applied to the water. Thermal dose enhancer 1740 allows for additional time at high temperature so that a higher thermal dose is applied to the water. The higher thermal dose is achieved with a delay line 1742 and typically some insulation 1744 surrounding the delay line 1742 . Water from the outlet 1720-2 of auxiliary heater 1720 flows through the thermal dose enhancer 1740, out of outlet 1740 to line 1748 to second heat exchanger section 1704 as discussed previously. In an alternate embodiment, thermal dose enhancer 1740 may include a small tank (not shown) that replaces or augments the delay line 1742 .

In a further embodiment, the two part heat exchanger 1701 of FIG. 32 may advantageously be constructed as two heat exchangers if a solid wall section is placed at dotted line 1706, and a connection between the now separated first and second heat exchanger sections 1702, 1704 is provided with line 1708. If desired, in either of these embodiments, one or more hot taps (not shown) may be placed in second heat exchanger section 1704 similar to treated water outlets 151, 152, 153.

Figure 34:
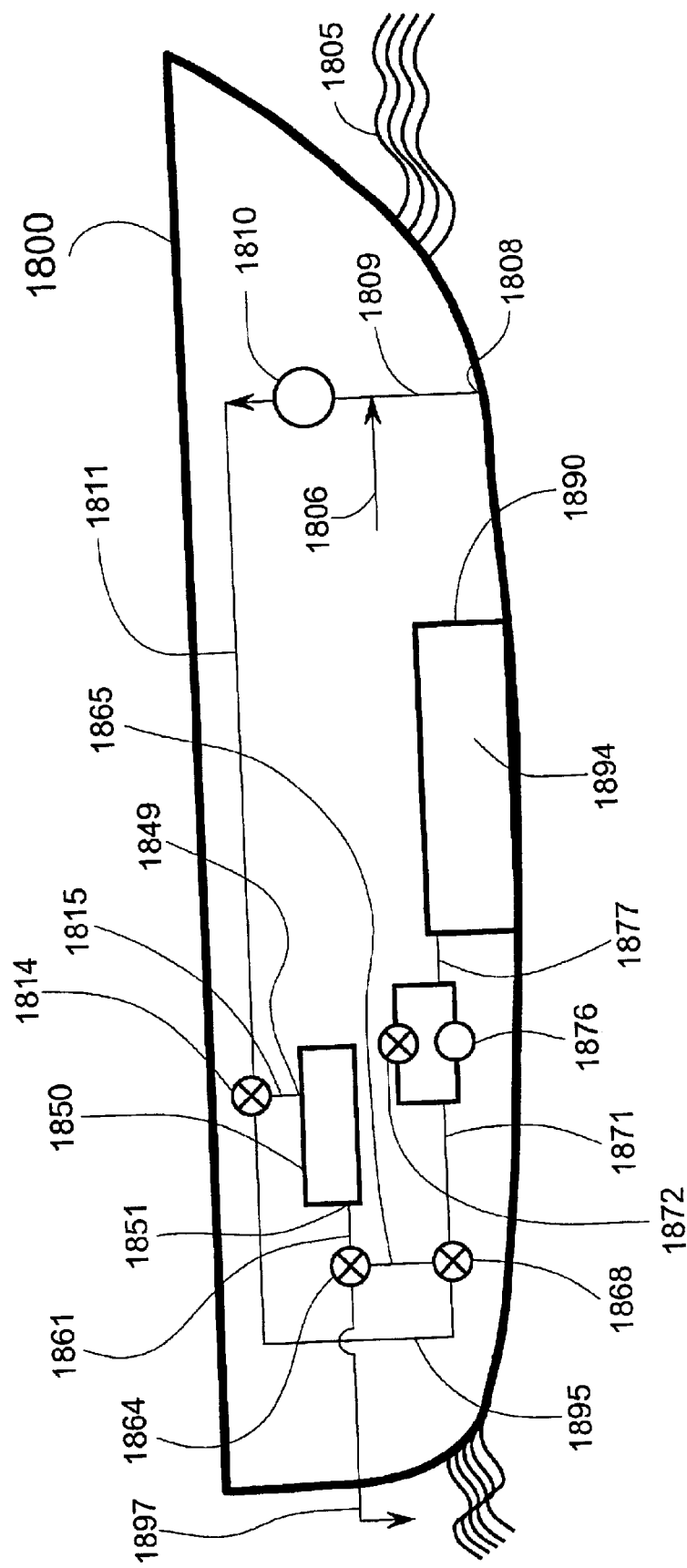
FIG. 34 is a schematic of a system for treating ballast and/or bilge water on a ship 1800.

Referring now to FIG. 34, this figure depicts apparatus for thermally treating ballast and/or bilge water to prevent ship-mediated spread of water-borne diseases and organisms to inappropriate ecosystems. As discussed earlier, it may be desirable to pretreat ballast or bilge water to remove solids or liquids such as oil by filtration, centrifugation and the like methods known in the art, prior to thermally treating the ballast or bilge water. The system depicted can provide the thermal treatment of both incoming and outgoing ballast and bilge water in the three scenarios discussed below. Those skilled in the art will be able to appropriately configure the system to work only to thermally treat incoming or outgoing water. Although only one thermal treatment system and one ballast tank is shown in FIG. 34, more than one treatment system and/or more than one ballast tank may be used as appropriate for each type of ship. A water going vessel 1800 (e.g. sailing vessel, steamship, diesel powered ship, or nuclear powered ship) typically has one or more ballast tanks 1890 that are filled with ballast water 1894 at various ports to provide stability during transit. The thermal water treatment described in this example can, in addition to treating ballast water, can also treat bilge water. Typically the water is stored in a tank such as a ballast tank or other tank for a storage time sufficient to allow the ship to complete its cargo delivery. Typically the storage time is at least several hours, or about 1 day, or more. Water is typically pumped in by first pump 1810 and out by second pump 1876, or only one reversible pump may be needed at second pump 1876. Second pump 1876 may have a bypass valve 1872 when two pumps are used.

In other typical applications, the ballast water may be exchanged at sea so that the number of viable organisms is reduced when the ship enters port. While sea exchange is a currently used and approved option, the number of viable organisms is still not reduced in numbers to the point where thermal treatment according to the present invention is not needed when the ship enters its destination port.

Ballast water may be thermally treated in three ways; first it may be pumped untreated into a ballast tank and only thermally treated when it is pumped out into the environment; second, the water may only be thermally treated when it is pumped into a ballast tank; and third, the ballast water may be thermally treated both when it is pumped into the ballast tank 1890 and when it is pumped out. The latter case provides the best thermal treatment for inactivation of organisms. In any of these cases the energy costs will be small because of heat recovery by a heat exchanger as previously discussed herein. As will be appreciated by those skilled in the art, various designs for thermal treatment system 1850 may be used as typically exemplified by FIGS. 2 through 33. However, it is envisioned that only one output from a heat exchanger would be required, a cold thermally treated water outlet 151. This would provide the greatest efficiency for thermal treatment of the ballast water 1894. If desired a system for purifying the water lines and thermal treatment system, as described earlier, may be used here also to inactivate organisms that may build up in the various lines or other apparatus. If desired, a tank such as tank 800 may be built on the ship to provide additional thermal treatment time. Tank 800 or a tank that replaces delay line 1742 may be built as an insulated onboard tank that may include at least one thermally insulated ballast tank, wherein the thermal dose received by ballast water is enhanced.

In operation, water 1805 outside the ship would be drawn into inlet 1808 and flow to first pump 1810 via line 1809 from which it would flow through line 1811 to first three-way valve 1814 and then via line 1815 to the inlet 1849 of thermal treatment system 1850. Alternatively, pretreated bilge water 1806 may be drawn in at line 1806. On being purified in heat treatment system 1850, thermally treated water flows from thermal treatment system outlet 1851 via line 1861 to a second three-way valve 1864. From second three-way valve 1864 the thermally treated water flows via line 1865 to a third three-way valve 1868. From the third three-way valve 1868 the thermally treated water flows via line 1871 to bypass valve 1872 or second pump 1876 and via line 1877 to ballast tank 1890. Details of valve settings for first three-way valve 1814, second three-way valve 1864, and third three-way valve 1868 are shown for incoming water that is to be treated for the first time in FIG. 35.

When the ballast water 1894 needs to be pumped out, it may be pumped directly to the ocean if it has been thermally treated as described herein and is uncontaminated. Second pump 1876 is turned on and water from ballast tank 1894 flows out via line 1877 through second pump 1876 to third three-way valve 1868 and via line 1895 to second three-way valve 1864, then via line 1897 to the surrounding water outside the ship.

If additional thermal treatment is desired, second pump 1876 is turned on and ballast water 1894 from ballast tank 1894 flows out via line 1877 through second pump 1876 to third three-way valve 1868 and via line 1895 to first three-way valve 1814 and into the thermal treatment system 1850 at inlet 1849. When thermally treated, the water leaves thermal treatment system 1850 at outlet 1851 and flows via line 1861 to second three-way valve 1864, then via line 1897 to the surrounding water outside the ship. FIG. 36 shows details of valve settings for first three-way valve 1814, second three-way valve 1864 and third three-way valve 1868 for water being pumped from ballast tank 1890 that is to be treated a first or second time in thermal treatment system 1850.

If a second thermal treatment is not desired, second pump 1876 is turned on and water from the ballast tank 1890 would flow via line 1877 to second pump 1876, via line 1871 to third three-way valve 1868, then via line 1865 to the second three-way valve 1864 and via line 1897 to the surrounding water outside the ship. FIG. 37 shows details of valve settings for second three-way valve 1864 and third three-way valve 1868 for water being pumped from ballast tank 1890 that is not treated a first or second time in thermal treatment system 1850. First three-way valve 1814 may be at any setting since it is not involved in the flow of water.

If a first thermal treatment is not desired, the flow of incoming water would bypass the thermal treatment system 1850 via line 1895 and only be thermally treated as it is being pumped out of ballast tank 1890 and discharged to the surrounding water 1805 outside the ship after treatment in thermal treatment system 1850. FIG. 38 shows details of valve settings for first three-way valve 1814, second three-way valve 1864 and third three-way valve 1868 for water treatment from outside the ship that is not treated before entering the ballast tank 1890. Second three-way valve 1864 may be at any setting since it is not involved in the flow of water. This embodiment, where water from outside the ship is pumped untreated to the ballast tank 1890, is not preferred because it allows the growth and transport of high concentrations of organism in the ballast tank of the ship. It is preferable that the water entering the ballast tank 1890 be thermally treated.

Two noted advantages of the invention disclosed herein versus simply heating the discharged water or using chemical treatments are lowered costs due to heat recovery, the minimal thermal impact of the discharged water to the surrounding water 1805, and the reduction of chemicals discharged to waters surrounding the ship.

A further embodiment of the invention includes a method for thermally treating ballast and/or bilge water including the steps of: (1) pumping water from a ship's surroundings or from a ship's interior to a thermal treatment system according to the present invention, (2) treating the water with heat to provide a thermal dose sufficient to inactivate a selected percent of selected organisms present in the water, and (3) pumping the thermally treated water to a ballast tank on the ship. A yet further embodiment includes a method for thermally treating ballast and/or bilge water including the steps of: (1) pumping water from a ship's surroundings or from a ship's interior to a tank on the ship; (2) holding the water in the tank for about one day or more, (3) pumping the held water to a thermal treatment system according to the present invention, (4) treating the water with heat to provide a thermal dose sufficient to inactivate a selected percent of selected organisms present in the water; and (5) discharging the thermally treated water to the environment. A still further embodiment includes a method for treating ballast and/or bilge water including the steps of: (1) pumping water from a ship's surroundings or from a ship's interior to a thermal treatment system according to the present invention, (2) treating the water with heat to provide a thermal dose sufficient to inactivate a selected percent of selected organisms present in the water, and (3) pumping the thermally treated water to a tank on the ship and holding the water in the tank, (4) pumping the held water to the thermal treatment system according to the present invention, (5) treating the held water with heat to provide a thermal dose sufficient to inactivate a selected percent of selected organisms present in the held water, and (6) pumping the thermally treated held water outside the ship.

While the forms of the invention herein disclosed constitute presently preferred embodiments, many others are possible. It is not intended herein to mention all of the possible equivalent forms or ramifications of the invention. It is to be understood that the terms used herein are merely descriptive, rather than limiting, and that various changes may be made without departing from the spirit of the scope of the invention.

We claim:

1. An apparatus for providing purified water comprising:
   A. a heat exchanger for exchanging heat between purified water and makeup water, having a makeup water inlet and a preheated makeup water outlet; at least one heat exchange surface between said purified water and makeup water, a treated water inlet, and at least two or more treated water outlets, wherein said treated water outlets provide purified water at different temperatures; and
   B. a water heater tank with a tank inlet and a tank outlet, capable of heating said makeup water to a temperature sufficient to inactivate selected organisms and provide purified water;
   wherein said tank inlet is connected to said heat exchanger preheated makeup water outlet and said tank outlet is connected to said heat exchanger treated water inlet.

2. The apparatus according to claim 1, wherein said two or more treated water outlets are located upstream or downstream from each other respectively.

3. The apparatus according to claim 1, comprising a dip tube connected to said tank inlet within said tank and a flexible cone diffuser at the outlet of said dip tube to reduce the velocity of the makeup water and maintain temperature stratification within said water heater tank.

4. The apparatus according to claim 1, further comprising three or more treated water outlets on said heat exchanger for removing purified water at different temperatures therefrom.

5. The apparatus of claim 1, comprising a monitoring device for sensing water temperatures at one or more locations of said apparatus.

6. The apparatus according to claim 5, comprising a monitoring device for determining time/temperature relationships at one or more locations of said apparatus to determine if water has been purified to a predetermined amount.

7. The apparatus according to claim 6, wherein said monitoring device provides signals perceptible by a user at one or more locations as to the status of temperature, or time/temperature conditions or relationships for purification of water at various locations on said apparatus.

8. The apparatus according to claim 7, wherein at least one of said locations is on or in said water heater tank.

9. The apparatus according to claim 8, wherein said monitoring device shuts off one or more treated water outlets whenever predetermined temperature, or time/temperature conditions or relationships are not met.

10. The apparatus according to claim 9, wherein said monitoring device shuts off water flow through the purified water apparatus whenever predetermined temperature, or time/temperature conditions or relationships are not met.

11. The apparatus according to claim 10, wherein said monitoring device reopens said water flow when said predetermined conditions are restored.

12. The apparatus according to claim 7, wherein said monitoring device emits an audible signal perceptible by a user at one or more locations whenever predetermined temperature, or time/temperature conditions or relationships are not met.

13. The apparatus according to claim 7, wherein said signal comprises one or more lights at one or more locations.

14. The apparatus according to claim 7, wherein said signal comprises a digital display of one or more conditions sensed.

15. The apparatus according to claim 1, comprising bypass means for bypassing said heat exchanger with makeup water and interrupting the flow of makeup water through said heat exchanger.

16. The apparatus according to claim 15, wherein said bypass means comprises;
   A. a valve connected to said inlet of said heat exchanger, said valve operable to stop makeup water flow to said heat exchanger and redirecting said flow of makeup water; and
   B. water lines connected to one outlet of said valve for receiving redirected makeup water from said valve and redirecting said makeup water to said water heater.

17. The apparatus according to claim 1, comprising a second tank for storage and/or heating of purified heated water.

18. The apparatus according to claim 1, comprising a dip tube connected to said tank inlet within said tank and a brush-type diffuser at the outlet of said dip tube to reduce the velocity of the makeup water and maintain temperature stratification within said water heater tank.

19. The apparatus of claim 1 wherein said water heater tank is heated by heating means utilizing an energy source selected from the list consisting of natural gas, propane, butane, fuel oil, electricity, steam, and heat from a heat pump.

20. The apparatus according to claim 1, comprising at least one baffle in said water heater tank for reducing mixing of hot water in the upper portion of said water heater tank with cooler water in the lower portion of said water heater tank.

21. The apparatus according to claim 20, wherein said at least one baffle comprises a floating baffle having a predetermined specific gravity.

22. The apparatus according to claim 21, wherein said floating baffle comprises a plurality of floats having a predetermined specific gravity.

23. The apparatus according to claim 22, wherein said plurality of floats comprises a plurality of spheres, ovoids, cubes or other shaped structures having a predetermined specific gravity.

24. The apparatus according to claim 20, wherein said baffle comprises a heated baffle system.

25. The apparatus according to claim 20, wherein said baffle comprises a heated baffle.

26. A water purifier comprising:
   A. a heat exchanger for exchanging heat between purified water and makeup water, and having a makeup water inlet and a preheated makeup water outlet; and a hot treated water inlet and at least two treated water outlets for withdrawing treated water at a reduced temperature, wherein said treated water outlets provide purified water at different temperatures;
   B. a water heater with an inlet and an outlet, capable of heating said makeup water to a temperature sufficient to inactivate selected organisms and provide purified water;
   wherein said water heater inlet is connected to said heat exchanger preheated makeup water outlet and said water heater outlet is connected to said heat exchanger hot treated water inlet; and
   C. at least one mixing valve with an outlet and at least two inlets having a first inlet connected to one treated water outlet of said heat exchanger, for obtaining purified water at a reduced temperature therefrom, and a second inlet connected to said water heater outlet for obtaining hot purified water, wherein said mixing valve provides purified water at said mixing valve outlet at an intermediate temperature between said hot purified water and said reduced temperature purified water.

27. The water purifier according to claim 26, wherein said heat exchanger comprises a counter-flow heat exchanger.

28. The water purifier according to claim 27, wherein said water purifier is capable of heating said makeup water to between 140° F. (60° C.) and the saturation temperature of the water.

29. The water purifier according to claim 28, wherein said water purifier is capable of heating said makeup water for a time sufficient to provide a thermal dose for selected organisms.

30. The water purifier according to claim 26, wherein said water heater comprises a tank-type water heater.

31. The heat exchanger according to claim 26, wherein said water purifier comprises two mixing valves, wherein the second mixing valve is connected to the same sources of hot and cold purified water as the first mixing valve.

32. An apparatus for providing treated water comprising:
   A. a heat exchanger having a first section and a second section located upstream from said first section for exchanging heat, wherein said first section exchanges heat between water from an auxiliary heater to makeup water, and said second section exchanges heat between water from an auxiliary heater to water from a water tank, said heat exchanger first section having a makeup water inlet and a preheated makeup water outlet; at least one heat exchange surface in said first section between said water from said auxiliary heater and makeup water, said heat exchanger second section having at least one surface between said water from said auxiliary heater and said water from said water tank, said second heat exchanger section having an inlet for water from said auxiliary heater water and an outlet for water to said auxiliary water heater, an inlet for water from said water tank, and said first section having at least one or more treated water outlets;
   B. a water heater tank with a tank inlet and a tank outlet, wherein said tank inlet is connected to receive water from said first section heat exchanger preheated makeup water outlet and said tank outlet is connected to deliver water to a second section inlet for water from said water tank; and wherein said water tank and said auxiliary heater are capable of heating said makeup water to a temperature sufficient to inactivate selected organisms and provide treated water; and
   C. an auxiliary heater having an inlet connected to an outlet from said second section of said heat exchanger for receiving water from said water tank that has been preheated in said second heat exchanger section, and said auxiliary heater having an outlet connected to said inlet on said second section heat exchanger for water from said auxiliary heater.

33. An apparatus for providing treated water comprising:
   A. a heat exchanger for exchanging heat between treated water and makeup water, having a makeup water inlet and a preheated makeup water outlet; at least one heat exchange surface between said treated water and makeup water, a treated water inlet, and at least two or more treated water outlets, wherein said treated water outlets provide water at different temperatures; and
   B. a water heater tank with a tank inlet and a tank outlet, capable of heating said makeup water to a temperature sufficent to inactivate selected organisms and provide treated water;
   wherein said tank inlet is connected to said heat exchanger preheated makeup water outlet and said tank outlet is connected to said heat exchanger treated water inlet.

34. The apparatus according to claim 33, wherein said two or more treated water outlets are located upstream or downstream from each other respectively.

35. The apparatus according to claim 33, comprising bypass means for bypassing said heat exchanger with makeup water and interrupting the flow of makeup water through said heat exchanger.

36. The apparatus according to claim 33, wherein said bypass means comprises;
   A. a valve connected to said inlet of said heat exchanger, said valve operable to stop makeup water flow to said head exchanger and redirecting said flow of makeup water; and
   B. water lines connected to one outlet of said valve for receiving redirected makeup water from said valve and redirecting said makeup water to said water heater.

37. A water treating system comprising:
   A. a heat exchanger for exchanging heat between treated water and makeup water, and having a makeup water inlet and a preheated makeup water outlet; and a hot treated water inlet and at least two outlets for withdrawing treated water at a reduced temperature, wherein said treated water outlets provide treated water at different temperatures;
   B. a water heater with an inlet and an outlet, capable of heating said makeup water to a temperature sufficient to inactivate selected organisms and provide treated water; wherein said water heater inlet is connected to said heat exchanger preheated makeup water outlet and said water heater outlet is connected to said heat exchanger hot treated water inlet; and
   C. at least one mixing valve with an outlet and at least two inlets having a first inlet connected to one treated water outlet of said heat exchanger, for obtaining treated water at a reduced temperature therefrom, and a second inlet connected to said water heater outlet for obtaining hot treated water, wherein said mixing valve provides treated water at said mixing valve outlet at an intermediate temperature between said hot treated water and said reduced temperature treated water.

38. The water treating system according to claim 37, wherein said heat exchanger comprises a counter-flow heat exchanger.

39. The water treating system according to claim 37, wherein said water heater comprises a tank-type water heater.

* * * * *